(12) United States Patent
Giraldo et al.

(10) Patent No.: US 10,934,223 B2
(45) Date of Patent: Mar. 2, 2021

(54) SYSTEM AND METHOD FOR RECOVERING NITROGENOUS COMPOUNDS FROM A GAS STREAM

(71) Applicant: NUORGANICS LLC, Robbinsville, NJ (US)

(72) Inventors: Eugenio Giraldo, Robbinsville, NJ (US); Barbara Jean Wingler, Robbinsville, NJ (US); Gabriel Howard Giraldo-Wingler, Robbinsville, NJ (US)

(73) Assignee: NUORGANICS LLC, Robbinsville, NJ (US)

( * ) Notice: Subject to any disclaimer, the term of this patent is extended or adjusted under 35 U.S.C. 154(b) by 0 days.

(21) Appl. No.: 16/676,059

(22) Filed: Nov. 6, 2019

(65) Prior Publication Data

US 2020/0071237 A1    Mar. 5, 2020

Related U.S. Application Data

(63) Continuation of application No. 15/872,574, filed on Jan. 16, 2018, now Pat. No. 10,513,466.
(Continued)

(51) Int. Cl.
*C05C 3/00* (2006.01)
*B01D 53/46* (2006.01)
(Continued)

(52) U.S. Cl.
CPC ............... *C05C 3/00* (2013.01); *B01D 53/46* (2013.01); *B01D 53/58* (2013.01); *B01D 53/78* (2013.01);
(Continued)

(58) Field of Classification Search
CPC . A61L 9/14; A61L 9/145; A61L 11/00; A61L 2209/00; A61L 2209/10;
(Continued)

(56) References Cited

U.S. PATENT DOCUMENTS 1,310,306 A    7/1919  Sperr, Jr.
2,822,245 A    2/1958  Shipman et al.
(Continued)

FOREIGN PATENT DOCUMENTS

AT         254225 B    5/1967
AU        3561071 A    5/1973
(Continued)

*Primary Examiner* — Timothy C Vanoy
(74) *Attorney, Agent, or Firm* — Lando & Anastasi, LLP

(57) ABSTRACT

Methods of producing a treated gas by removing nitrogenous compounds are disclosed. Methods of recovering nitrogenous compounds from a gas stream are disclosed. Methods of producing a fertilizer product from organic waste are disclosed. The methods may include introducing a gas stream having nitrogenous compounds into a nitrogenous liquid containing a salt of ammonia to absorb the nitrogenous compounds in the liquid and produce a treated gas. The methods may also include controlling the pH of certain solutions or introducing an oxidant into certain solutions to produce nitrogen ions. Systems for removing nitrogenous compounds including a reaction subsystem, an oxidation control subsystem, a dissolved solids concentrator, and a recirculation line are also disclosed. The systems may be employed to remove nitrogenous compounds from a gas stream, recover the nitrogenous compounds from the gas stream, or produce a fertilizer product from the recovered nitrogenous compounds.

41 Claims, 13 Drawing Sheets

Related U.S. Application Data

(60) Provisional application No. 62/446,713, filed on Jan. 16, 2017.

(51) Int. Cl.
  *B01D 53/58* (2006.01)
  *B01D 53/78* (2006.01)
  *B01D 53/84* (2006.01)

(52) U.S. Cl.
  CPC ........ *B01D 53/84* (2013.01); *B01D 2251/102* (2013.01); *B01D 2251/104* (2013.01); *B01D 2255/804* (2013.01); *B01D 2257/406* (2013.01); *B01D 2258/0266* (2013.01)

(58) Field of Classification Search
  CPC ............. A61L 2209/20; A61L 2209/21; A61L 2209/212; A61L 2209/22; A61K 31/18; A61K 31/22; A62D 3/30; A62D 3/36; A62D 2101/26; B01D 53/58; B01D 53/78; B01D 2251/206; B01D 2252/103; B01D 2257/406; B01D 2258/0266; B01J 10/00
  See application file for complete search history.

(56) References Cited

U.S. PATENT DOCUMENTS

| | | | |
|---|---|---|---|
| 3,036,417 A | 5/1962 | Melin, Jr. |
| 3,369,869 A | 2/1968 | Wilhelm |
| 3,739,551 A | 6/1973 | Eckert |
| 3,785,127 A | 1/1974 | Mare |
| 3,969,479 A | 7/1976 | Lonnes et al. |
| 3,991,161 A | 11/1976 | Saitoh et al. |
| 3,992,508 A | 11/1976 | Saitoh et al. |
| 4,039,289 A | 8/1977 | Collins et al. |
| 4,058,375 A | 11/1977 | Lawrence |
| 4,183,902 A | 1/1980 | Hashimoto et al. |
| 4,223,614 A | 9/1980 | Barkhuus et al. |
| 4,269,812 A | 5/1981 | Edwards et al. |
| 4,271,134 A | 6/1981 | Teller |
| 4,287,162 A | 9/1981 | Scheibel |
| 4,343,771 A | 8/1982 | Edwards et al. |
| 4,405,354 A | 9/1983 | Thomas, II et al. |
| 4,425,313 A | 1/1984 | Cooper |
| 4,437,867 A | 3/1984 | Lerner |
| 4,948,402 A | 8/1990 | Davis |
| 5,308,589 A | 5/1994 | Yung |
| RE35,234 E | 5/1996 | Davis |
| 5,595,713 A | 1/1997 | Gohara et al. |
| 5,614,102 A | 3/1997 | Sakurada |
| 5,674,459 A | 10/1997 | Gohara et al. |
| 5,814,292 A | 9/1998 | Foster et al. |
| 5,876,662 A | 3/1999 | Jain |
| 6,030,494 A | 2/2000 | Hupa et al. |
| 6,174,498 B1 | 1/2001 | Jain et al. |
| 6,638,398 B1 | 10/2003 | Ramm-Schmidt et al. |
| 6,645,450 B2 | 11/2003 | Stoltz et al. |
| 7,105,039 B2 | 9/2006 | Decker |
| 7,112,309 B2 | 9/2006 | Stoltz et al. |
| 7,258,848 B1 | 8/2007 | Blackwell et al. |
| 7,270,796 B2 | 9/2007 | Kemp et al. |
| 7,416,668 B1 | 8/2008 | Theodore |
| 7,550,123 B2 | 6/2009 | Temple et al. |
| 7,553,447 B2 | 6/2009 | Decker et al. |
| 7,563,372 B1 | 7/2009 | Theodore |
| 7,632,475 B2 | 12/2009 | Suchak et al. |
| 7,815,879 B2 | 10/2010 | Temple et al. |
| 7,867,398 B2 | 1/2011 | Harmon et al. |
| 7,964,166 B2 | 6/2011 | Suchak |
| 7,972,408 B2 | 7/2011 | Bruso et al. |
| 8,007,567 B2 | 8/2011 | Roe et al. |
| 8,101,070 B2 | 1/2012 | Theodore et al. |
| 8,182,576 B2 | 5/2012 | Roe et al. |
| 8,182,593 B2 | 5/2012 | Rapp |
| 8,409,512 B2 | 4/2013 | Temple et al. |
| 8,613,894 B2 | 12/2013 | Zhao et al. |
| 8,940,258 B2 | 1/2015 | Vera-Castaneda |
| 9,005,333 B1 | 4/2015 | Vanotti et al. |
| 9,005,533 B2 | 4/2015 | Gaiser |
| 9,095,115 B1 | 8/2015 | Knueven et al. |
| 9,265,854 B2 | 2/2016 | Temple et al. |
| 9,364,788 B2 | 6/2016 | Taube |
| 9,522,206 B2 | 12/2016 | Beaulieu et al. |
| 9,597,631 B2 | 3/2017 | Taube |
| 10,513,466 B2 * | 12/2019 | Giraldo .................. B01D 53/46 |
| 2001/0043898 A1 | 11/2001 | Stoltz et al. |
| 2004/0115112 A1 | 6/2004 | Stoltz et al. |
| 2004/0237782 A1 | 12/2004 | Decker |
| 2007/0000386 A1 | 1/2007 | Decker |
| 2007/0023342 A1 | 2/2007 | Bruso et al. |
| 2007/0059229 A1 | 3/2007 | Temple et al. |
| 2008/0175777 A1 | 7/2008 | Suchak et al. |
| 2008/0213126 A1 | 9/2008 | Decker et al. |
| 2009/0255863 A1 | 10/2009 | Theodore et al. |
| 2010/0024644 A1 | 2/2010 | Temple et al. |
| 2010/0037772 A1 | 2/2010 | Roe et al. |
| 2010/0119427 A1 | 5/2010 | Suchak |
| 2010/0193429 A1 | 8/2010 | Harmon et al. |
| 2011/0104012 A1 | 5/2011 | Temple et al. |
| 2012/0000357 A1 | 1/2012 | Roe et al. |
| 2012/0006746 A1 | 1/2012 | Rapp |
| 2012/0152853 A1 | 6/2012 | Rapp |
| 2013/0186823 A1 | 7/2013 | Hazewinkel |
| 2013/0202480 A1 | 8/2013 | Temple et al. |
| 2013/0315807 A1 | 11/2013 | Vera-Castaneda |
| 2014/0144384 A1 | 5/2014 | Eutsler et al. |
| 2014/0170725 A1 | 6/2014 | Andrews et al. |
| 2015/0265963 A1 | 9/2015 | Taube |
| 2015/0299056 A1 | 10/2015 | Ingels |
| 2015/0359917 A1 | 12/2015 | Beaulieu et al. |
| 2016/0067652 A1 * | 3/2016 | Moore, Jr. .............. C05F 17/90 |
| | | 435/266 |
| 2016/0129392 A1 | 5/2016 | Temple et al. |
| 2016/0200613 A1 | 7/2016 | Orentlicher et al. |
| 2016/0256817 A1 | 9/2016 | Taube |
| 2017/0056821 A1 | 3/2017 | Beaulieu et al. |
| 2017/0291825 A1 | 10/2017 | Tao et al. |
| 2018/0257028 A1 | 9/2018 | Andrews et al. |

FOREIGN PATENT DOCUMENTS

| | | |
|---|---|---|
| AU | 459415 B2 | 3/1975 |
| AU | 4895879 A | 1/1980 |
| AU | 5624480 A | 9/1980 |
| AU | 6020680 A | 1/1981 |
| AU | 531104 B2 | 8/1983 |
| AU | 534155 B2 | 1/1984 |
| AU | 2008200308 A1 | 8/2008 |
| BE | 655305 A | 3/1965 |
| BE | 770769 A1 | 12/1971 |
| BE | 877742 A1 | 11/1979 |
| BE | 884358 A1 | 1/1981 |
| BE | 888237 A1 | 7/1981 |
| BR | PI0800452 A1 | 4/2008 |
| BR | PI0800452 A | 9/2008 |
| BR | 112012011432 A1 | 5/2016 |
| BR | 112014027446 A1 | 6/2017 |
| CA | 942662 A | 2/1974 |
| CA | 960437 A | 1/1975 |
| CA | 968270 A | 5/1975 |
| CA | 1106777 A | 8/1981 |
| CA | 1121658 A | 4/1982 |
| CA | 1121980 A | 4/1982 |
| CA | 1124037 A | 5/1982 |
| CA | 1154934 A | 10/1983 |
| CA | 2157644 A1 | 3/1996 |
| CA | 2246628 A1 | 3/1999 |
| CA | 2618778 A1 | 7/2008 |
| CH | 481018 A | 11/1969 |
| CH | 622083 A5 | 3/1981 |
| CN | 101301567 A | 11/2008 |
| CN | 202356007 U | 8/2012 |

(56) References Cited

FOREIGN PATENT DOCUMENTS

| | | |
|---|---|---|
| DE | 1467204 A1 | 11/1969 |
| DE | 2156455 A1 | 5/1972 |
| DE | 2136290 A1 | 8/1972 |
| DE | 2502117 A1 | 7/1975 |
| DE | 2502118 A1 | 7/1975 |
| DE | 2820850 A1 | 11/1978 |
| DE | 2928693 A1 | 2/1980 |
| DE | 3027330 A1 | 2/1981 |
| DE | 3064930 D1 | 10/1983 |
| DE | 3066233 D1 | 3/1984 |
| DE | 4000540 A1 | 7/1991 |
| DE | 4240152 C1 | 6/1994 |
| DE | 19840513 A1 | 4/1999 |
| DK | 107608 C | 6/1967 |
| DK | 299579 A | 1/1980 |
| EP | 0016591 A1 | 10/1980 |
| EP | 0024551 A2 | 3/1981 |
| EP | 1950176 A2 | 7/2008 |
| EP | 2628388 A1 | 8/2013 |
| EP | 2483206 B1 | 3/2017 |
| EP | 3256245 A4 | 7/2018 |
| ES | 306217 A1 | 4/1965 |
| ES | 482981 A1 | 6/1980 |
| ES | 501020 | 12/1982 |
| FI | 43429 B | 12/1970 |
| FI | 973617 | 9/1997 |
| FI | 973234 A | 10/1997 |
| FI | 973617 A | 3/1999 |
| FR | 1429548 A | 2/1966 |
| FR | 2117103 A5 | 7/1972 |
| FR | 2127497 A5 | 10/1972 |
| FR | 2258214 A1 | 8/1975 |
| FR | 2258215 A1 | 8/1975 |
| FR | 2390193 A1 | 12/1978 |
| FR | 2431660 A1 | 2/1980 |
| FR | 2461682 A1 | 2/1981 |
| GB | 1089880 A | 11/1967 |
| GB | 1357426 A | 6/1974 |
| GB | 1374448 A | 11/1974 |
| GB | 1393415 A | 5/1975 |
| GB | 1501701 A | 2/1978 |
| GB | 1501702 A | 2/1978 |
| GB | 2027526 A | 2/1980 |
| GB | 2053180 A | 2/1981 |
| GB | 1594524 A | 7/1981 |
| IL | 37247 A | 5/1974 |
| IL | 37247 B | 5/1974 |
| IL | 38868 A | 4/1975 |
| IL | 59381 A | 4/1984 |
| IL | 59381 B | 4/1984 |
| IN | 265604 B | 3/2015 |
| IT | 944922 B | 4/1973 |
| IT | 7823337 | 5/1978 |
| IT | 7968467 | 7/1979 |
| IT | 8023225 | 7/1980 |
| IT | 8148188 | 4/1981 |
| IT | 1095265 B | 8/1985 |
| IT | 1121003 B | 3/1986 |
| IT | 1131903 B | 6/1986 |
| JP | S5169478 A | 6/1976 |
| JP | S5136719 B2 | 10/1976 |
| JP | S5232354 B2 | 8/1977 |
| JP | S53139278 A | 12/1978 |
| JP | S5556817 A | 4/1980 |
| JP | S55124527 A | 9/1980 |
| JP | S5621628 A | 2/1981 |
| JP | S5659621 A | 5/1981 |
| JP | S60118223 A | 6/1985 |
| JP | S617324 B2 | 3/1986 |
| JP | S6315007 B2 | 4/1988 |
| JP | S63252530 A | 10/1988 |
| JP | H0521008 B2 | 3/1993 |
| JP | 2003062051 A | 3/2003 |
| KR | 20120013733 A | 2/2012 |
| KR | 101183665 B1 | 9/2012 |
| LU | 47182 A1 | 12/1964 |
| NL | 6413977 A | 8/1965 |
| NL | 7113852 A | 8/1972 |
| NL | 7500672 A | 7/1975 |
| NL | 7500673 A | 7/1975 |
| NL | 147944 B | 12/1975 |
| NL | 7905525 A | 1/1980 |
| NL | 8003958 A | 1/1981 |
| NO | 116907 B | 6/1969 |
| NO | 792367 A | 1/1980 |
| PL | 2483206 T3 | 9/2017 |
| SE | 313805 B | 8/1969 |
| SE | 370498 B | 10/1974 |
| SE | 7906121 L | 1/1980 |
| SE | 9802979 | 3/1999 |
| SE | 9802979 L | 3/1999 |
| SE | 523160 C2 | 3/2004 |
| TN | 2014000456 A1 | 3/2016 |
| WO | 8102891 A | 10/1981 |
| WO | 8102891 A1 | 10/1981 |
| WO | 9219380 A1 | 11/1992 |
| WO | 9827014 A1 | 6/1998 |
| WO | 200166230 A2 | 9/2001 |
| WO | 200166230 A3 | 1/2002 |
| WO | 2004011127 A1 | 2/2004 |
| WO | 2004105974 A2 | 12/2004 |
| WO | 2008016401 A1 | 2/2008 |
| WO | 2009076104 A1 | 6/2009 |
| WO | 2010019763 A1 | 2/2010 |
| WO | 2010128257 A1 | 11/2010 |
| WO | 2011060025 A1 | 5/2011 |
| WO | 2012031622 A1 | 3/2012 |
| WO | 2013166301 A1 | 11/2013 |
| WO | 2015143111 A1 | 9/2015 |
| WO | 2016012309 A1 | 1/2016 |

* cited by examiner

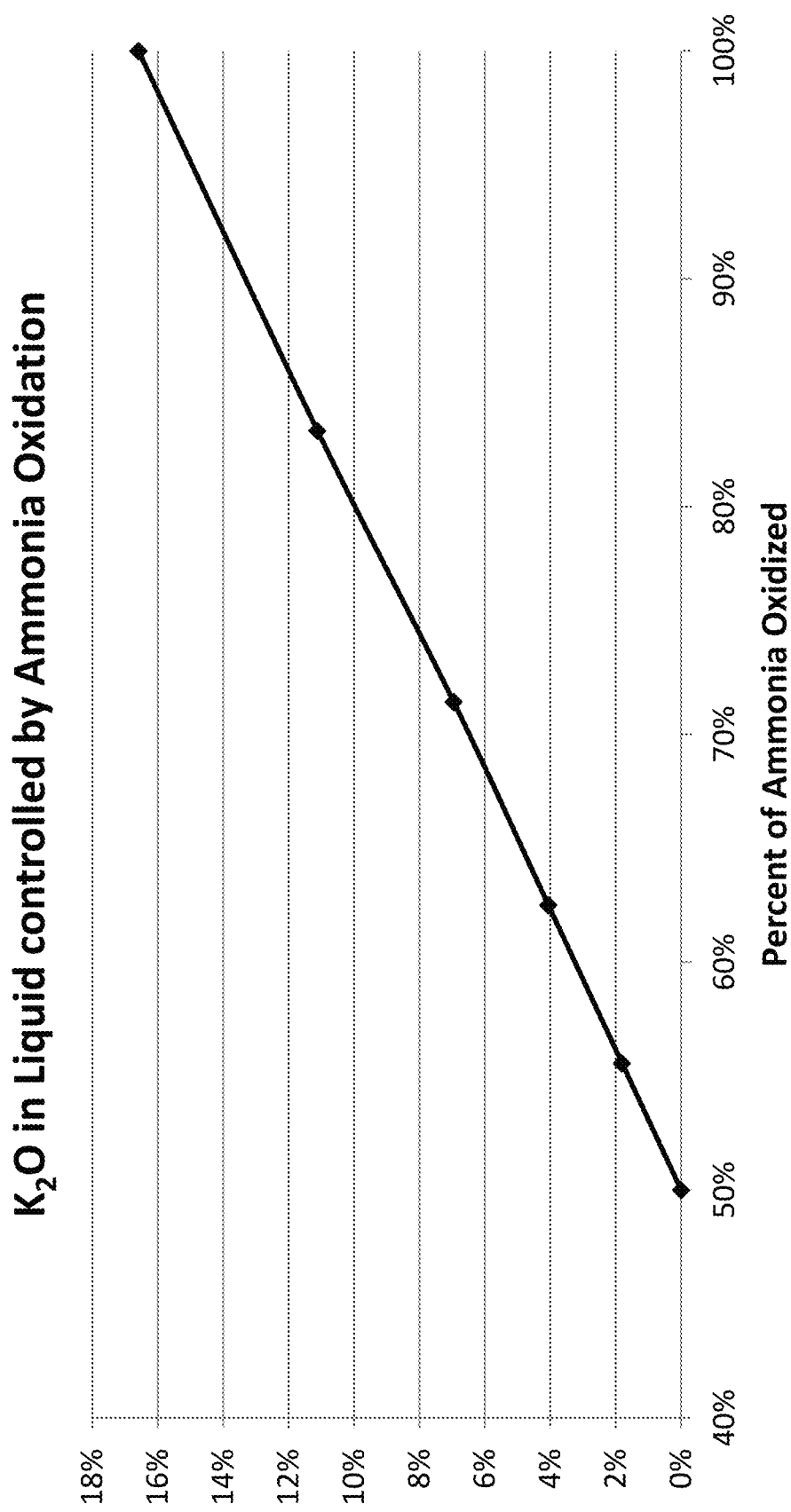

SYSTEM AND METHOD FOR RECOVERING NITROGENOUS COMPOUNDS FROM A GAS STREAM

CROSS-REFERENCE TO RELATED APPLICATIONS

This application claims priority under 35 U.S.C. § 120 as a continuation of U.S. patent application Ser. No. 15/872,574, titled "SYSTEM AND METHOD FOR RECOVERING NITROGENOUS COMPOUNDS FROM A GAS STREAM," filed Jan. 16, 2018, which claims priority under 35 U.S. § 119 to U.S. Provisional Patent Application No. 62/446,713 titled "Systems and Method for Recovering Nitrogenous Compounds from a Gas Stream" filed Jan. 16, 2017, each of which is herein incorporated by reference in its entirety for all purposes.

FIELD OF THE TECHNOLOGY

Aspects and embodiments disclosed herein relate to systems and methods for recovering nitrogen from a gas stream. In particular, systems and methods involve recovering nitrogen from gaseous emissions to produce a fertilizer.

SUMMARY

In accordance with an aspect, there is provided a method of producing a treated gas by removing nitrogenous compounds from a gas stream. The method may comprise introducing the gas stream comprising nitrogenous compounds into a nitrogenous liquid. The nitrogenous liquid may comprise a salt of ammonia. In some embodiments, the method may comprise introducing an oxidant into the nitrogenous liquid to produce oxy-anions of nitrogen. The method may further comprise maintaining the nitrogenous liquid and oxy-anions of nitrogen at a predetermined pH between about 3 and about 9 to control a concentration of the oxy-anions of nitrogen. The method of producing a treated gas may comprise discharging the treated gas comprising a reduced concentration of nitrogenous compounds.

In some embodiments, the oxy-anions of nitrogen may comprise at least one of nitrite and nitrate.

The method of producing a treated gas may further comprise producing the nitrogenous liquid by contacting the gas steam with water to oxidize at least a fraction of the nitrogenous compounds into the salt of ammonia.

In some embodiments, maintaining the predetermined pH comprises introducing a base into the nitrogenous liquid. The predetermined pH may be between about 6 and about 8.5.

The method of producing a treated gas may comprise maintaining a total dissolved solids concentration in the nitrogenous liquid between about 1 g/L and about 500 g/L.

The method may comprise dosing the nitrogenous liquid comprising the salt of ammonia with a biological catalyst.

In some embodiments, the method may further comprise drying organic material to produce the gas stream comprising nitrogenous compounds. The method may comprise separating solids from the gas stream. The organic material may comprise at least one of poultry manure and poultry litter.

The method of producing a treated gas may comprise maintaining a temperature of the nitrogenous liquid between about 4° C. and about 80° C.

In some embodiments, the treated gas comprises less than 1% nitrogen, sulfur, phosphate, and potassium.

In accordance with another aspect, there is provided a method of recovering nitrogenous compounds from a gas stream. The method may comprise introducing the gas stream comprising nitrogenous compounds into a nitrogenous liquid comprising a salt of ammonia. In some embodiments, the method may comprise introducing an oxidant into the nitrogenous liquid to oxidize a predetermined amount of the nitrogenous compounds into oxy-anions of nitrogen. The method of recovering nitrogenous compounds from a gas stream may further comprise collecting a liquid product comprising at least a fraction of the nitrogenous liquid, remaining nitrogenous compounds, and the oxy-anions of nitrogen.

The predetermined amount of the nitrogenous compounds to be oxidized may be between about 5% and about 50% of the nitrogenous compounds. In some embodiments, the method may further comprise introducing a base into the nitrogenous liquid. In such embodiments, the predetermined amount of the nitrogenous compounds to be oxidized may be between about 50% and about 100% of the nitrogenous compounds.

The method of recovering nitrogenous compounds from a gas stream may further comprise introducing a salt into water to produce a salt solution and electrically separating ions in the salt solution to produce the base and an acid.

In some embodiments, the method of recovering nitrogenous compounds from a gas stream may further comprise producing the nitrogenous liquid by contacting the gas stream with water to oxidize at least a fraction of the nitrogenous compounds into the salt of ammonia.

In some embodiments, the method may comprise concentrating the liquid product by removing excess water. The liquid product may be concentrated by at least one of reverse osmosis, electrodialysis, and evaporation. The liquid product may comprise at least 16% nitrogen by mass. In some embodiments, the method further comprises returning at least a fraction of the excess water to the nitrogenous liquid.

The method of recovering nitrogenous compounds from a gas stream may further comprise maintaining a pH of the nitrogenous liquid and oxy-anions of nitrogen between about 3 and about 9. The pH of the nitrogenous liquid and oxy-anions of nitrogen may be maintained between about 6 and about 8.5.

In some embodiments, the method may further comprise separating solids from the liquid product. The method may comprise dosing the nitrogenous liquid with a biological catalyst. In some embodiments, the method comprises returning at least a fraction of the separated solids to the nitrogenous liquid. The separated solids may comprise biological catalyst.

The method of recovering nitrogenous compounds from a gas stream may further comprise drying organic material to produce the gas stream comprising nitrogenous compounds. The method may comprise separating solids from the gas stream. The organic material may comprise at least one of poultry manure and poultry litter.

In some embodiments, the method may comprise maintaining a temperature of the nitrogenous liquid between about 4° C. and about 80° C.

The method may further comprise controlling a composition of the nitrogenous liquid by introducing a salt into the nitrogenous liquid.

In accordance with yet another aspect, there is provided a system for removing nitrogenous compounds from a gas stream. The system may comprise a reaction subsystem comprising at least one absorption chamber, a treated gas outlet, and a product outlet. In some embodiments, the reaction subsystem is fluidly connectable to a gas stream comprising nitrogenous compounds, a source of water, a source of an oxidant, and a source of a base. The reaction subsystem may be constructed and arranged to combine the gas stream, the water, the oxidant, and the base.

The system for removing nitrogenous compounds may comprise an oxidation control subsystem configured to maintain a predetermined oxidation reduction potential (ORP) within the reaction subsystem.

The system for removing nitrogenous compounds may comprise a dissolved solids concentrator fluidly connected downstream of the reaction subsystem through the product outlet. The dissolved solids concentrator may comprise a concentrated product outlet and a dilute liquid outlet.

The system for removing nitrogenous compounds may comprise a recirculation line extending between the dissolved solids concentrator through the dilute liquid outlet and a recycle inlet of the reaction subsystem.

In some embodiments, the reaction subsystem may be fluidly connectable to a source of a salt. The reaction subsystem may be constructed and arranged to combine the salt with the gas stream, the water, the oxidant, and the base.

The system for removing nitrogenous compounds may comprise a temperature sensor configured to measure temperature of one or more gases and solutions within the system. The system may comprise a control module electrically connected to the temperature sensor and configured to adjust a temperature within the reaction subsystem to a predetermined temperature, responsive to a measurement obtained by the temperature sensor. In some embodiments, the predetermined temperature is a temperature range between about 4° C. and about 80° C.

The system for removing nitrogenous compounds may comprise a heat exchanger constructed and arranged to transfer heat between the reaction subsystem and one or more of the gas stream and the source of the water. The heat exchanger may be employed to adjust a temperature within the reaction subsystem to between about 4° C. and about 80° C.

The system for removing nitrogenous compounds may comprise a pH meter configured to measure pH of a solution within the reaction subsystem. The system may comprise a control module electrically connected to the pH meter and configured to adjust the pH within the reaction subsystem responsive to a measurement obtained by the pH meter. In some embodiments, the control module may be configured to maintain the pH between about 3 and about 9. The control module may be configured to maintain the pH between about 6 and about 8.5.

The system for removing nitrogenous compounds may comprise an ORP sensor configured to measure ORP of a solution within the reaction subsystem. The system may further comprise a control module electrically connected to the ORP sensor and configured to adjust the ORP within the reaction subsystem responsive to a measurement obtained by the ORP sensor. The predetermined ORP may be between about +400 mV and about +900 mV.

The system for removing nitrogenous compounds may comprise a conductivity meter configured to measure conductivity of a gas or solution within the reaction subsystem. The system may further comprise a control module electrically connected to the conductivity meter and configured to adjust the conductivity of the gas or the solution within the reaction subsystem responsive to a measurement obtained by the conductivity meter. In some embodiments, the control module is configured to maintain a concentration of total dissolved solids in the solution within the reaction subsystem between about 1 g/L and about 500 g/L.

The system for removing nitrogenous compounds may comprise an organic material dryer. The system for removing nitrogenous compounds may comprise a solids-gas separator having a solids waste outlet and a gas stream outlet. The solids-gas separator may be fluidly connectable to the reaction subsystem through the gas stream outlet.

The system for removing nitrogenous compounds may comprise a solids-liquid separator fluidly connectable downstream of the reaction subsystem through the product outlet. The solids-liquid separator may comprise a solids outlet and liquid product outlet. In some embodiments, the dissolved solids concentrator may be fluidly connectable to the solids-liquid separator through the liquid product outlet. The system may further comprise a solids recirculation line extending from the solids outlet of the solids-liquid separator and the reaction subsystem.

In some embodiments, the source of the base comprises an acid base production subsystem comprising a salt inlet, a water inlet, a cation stream outlet, and an anion stream outlet. The cation stream outlet may be fluidly connectable to the reaction subsystem. The anion stream outlet may be fluidly connectable to a second reaction subsystem. The second reaction subsystem may comprise at least one absorption chamber, a treated gas outlet, and a product outlet. In some embodiments, the second reaction subsystem may be constructed and arranged to combine a gas stream comprising nitrogenous compounds, water, and the anion stream to produce a treated gas and a nitrogenous liquid product.

The system for removing nitrogenous compounds may comprise a wet electrostatic precipitator positioned within the at least one absorption chamber.

Still other aspects, embodiments, and advantages of these exemplary aspects and embodiments, are discussed in detail below. Moreover, it is to be understood that both the foregoing information and the following detailed description are merely illustrative examples of various aspects and embodiments, and are intended to provide an overview or framework for understanding the nature and character of the claimed aspects and embodiments.

BRIEF DESCRIPTION OF THE DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings:

FIG. 1B is a graph of $K_2O$ in liquid controlled by ammonia oxidation;

DETAILED DESCRIPTION

Figure 1A:
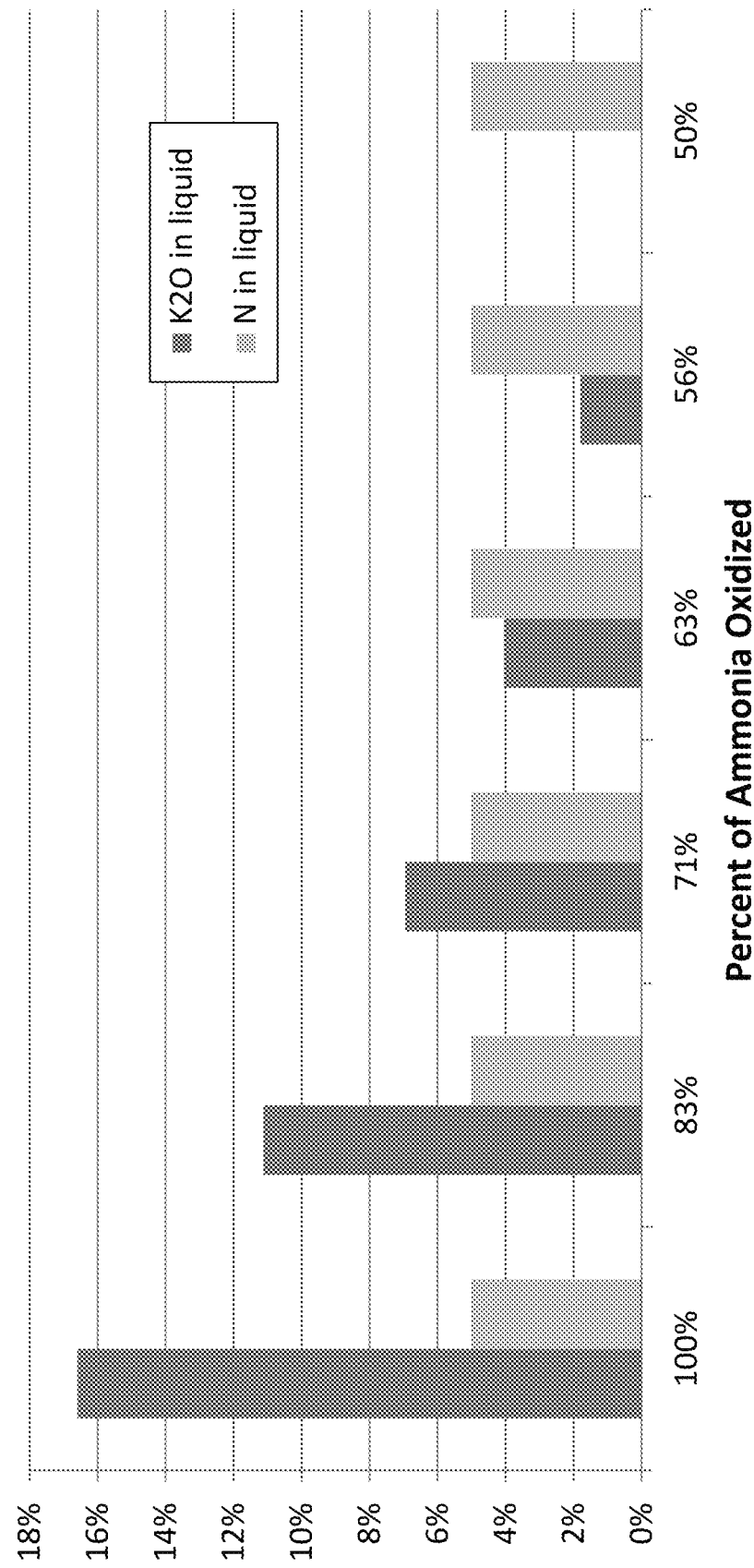
FIG. 1A is a graph of nitrogen and potassium composition controlled by ammonia oxidation.

Management of the nitrogen cycle has been identified by the National Academy of Engineers of the United States as one of the fourteen Grand Challenges of Engineering in the 21st Century. The nitrogen cycle has been disrupted over the last century by human intervention with the synthesis of reactive nitrogen species for fertilizer production and the combustion of fossil fuels. Nitrogen plays an essential role in the production of food for humanity as it is usually the limiting nutrient for crop productivity. It is hypothesized that the existing or future population of the world could not be sustained without producing ammonia from synthetic fertilizers. The methods currently used to meet worldwide food challenges, however, have led to excess nitrogen in the planetary environment which has generated daunting impacts around the world. Excess nitrogen in the environment may play a role in disruption of ecosystems by the eutrophication of waters like the Gulf of Mexico or Chesapeake Bay, exacerbation of global warming by production of potent greenhouse gases, acidification of lakes and soils, and contribution to the disruption of the ozone layer. Promotion of smog in densely populated areas and contamination of drinking water caused by excess environmental nitrogen may have a direct impact on human health. The combined impacts of nitrogen cycle disruption for the United States are an estimated $210 billion a year.

It is hypothesized that agriculture is responsible of over 50% of all reactive nitrogen inputs to the US. It was recently reported that ammonia deposition surpassed nitrogen oxides as the main atmospheric gas creating the most negative impact on natural ecosystems. Ammonia emissions to the atmosphere can be minimized by proper management of manures and agricultural residues. Recovery of ammonia to produce fertilizers may reduce input to the atmosphere and offset demands for synthetic nitrogen production. It is hypothesized that ammonia emissions during drying of manure or residuals from manure treatment processes, for example, anaerobic digestion, may account for up to 70% of the total nitrogen in the material. These ammonia emissions generally create a negative environmental impact and waste a valuable resource.

Ammonia may be recovered from a gas stream by external addition of acids into a liquid stream contacting the gas and the liquid stream, and ammonia, being a base when dissolved in water, is trapped in the liquid stream. Sulfuric acid may be employed to capture ammonia from the gas for production of ammonium sulfate. Carbonic acid may be employed for production of ammonium bicarbonate. In some applications absorption of ammonia gas in an acid may be conducted using a hydrophobic gas-porous-membrane. Nitric acid may be employed for scrubbing NOx from a gas stream. Generally, nitric acid is generated by oxidizing NOx in water using hydrogen peroxide.

In accordance with one or more embodiments, the gaseous nitrogenous compounds, including ammonia, can be recovered and converted into usable fertilizers for reuse in the agricultural production of food. The recovery and reuse of nitrogen may reduce ammonia emissions to the environment and contributes to a more sustainable food supply chain. Systems and methods disclosed herein may be employed to produce a fertilizer liquid that has an ideal proportion of anions and cations in solution for agricultural use. In some embodiments, the oxidation of ammonia for acid production may be chemical in nature while in other embodiments the oxidation of ammonia to produce scrubbing acid may be biological.

Ammonia may be recovered from a gas stream by contacting the gas with a liquid stream containing a salt of ammonia and/or oxy-anions of nitrogen, such as nitrite or nitrate. The salt of ammonia may be generated by contacting a gas stream comprising ammonia with water to absorb a fraction of the ammonia in the water. The oxy-anions of nitrogen may be generated by an oxidation reaction of ammonia in solution with an oxidizing agent such as, but not limited to, ozone or oxygen. The oxidation of ammonia to produce oxy-anions may generally reduce the pH of the solution. Effective control of pH may be employed to achieve a rate of oxidation useful in practice, for example, by addition of a base.

The following chemical reactions, which take place in one or more of the embodiments disclosed herein, illustrate the combination of an oxidant, ammonia gas, and water to produce ammonium salts in solution. Some of the reactions are physical and involve material transfer, while others are chemical in nature, like water ionization. In at least some embodiments, some reactions may be mediated by naturally present microorganisms in the liquid. In some embodiments the reactions of nitrogenous vapors with water and the oxidant may take place in one chamber. In other embodiments, the reactions may take place in separate chambers.

$$NH_3(gas) + H_2O(liquid) \rightarrow NH_3(aqueous) + H_2O \quad (1)$$

$$NH_3(aqueous) + 2H_2O(liquid) \leftrightarrow NH_4^+ + OH^- \quad (2)$$

$$NH_3(aqueous) + O_2(aqueous) \rightarrow NO_2^- + H^+ \quad (3)$$

$$NH_3(aqueous) + \tfrac{3}{2}O_2(aqueous) \rightarrow NO_3^- + H^+ \quad (4)$$

$$NH_3(aqueous) + \tfrac{2}{3}O_3(aqueous) \rightarrow NO_2^- + H^+ \quad (5)$$

$$NH_3(aqueous) + O_3(aqueous) \rightarrow NO_3^- + H^+ \quad (6)$$

$$KOH + H_2O \rightarrow K^+ + OH^- + H_2O \quad (7)$$

As shown in equations (1) and (2), ammonia nitrogen in gas form may be absorbed in a pH-controlled solution, forming ammonia gas in solution and ammonium ions. The extent of the ionization between ammonia and ammonium-cation may generally depend on the pH of the solution. Ammonia in solution reacts with an oxidant for example, ozone or oxygen, as shown in equations (3) through (6) to form oxy-anions of nitrogen. These oxidation reactions may be catalyzed by naturally occurring organisms which speed up the conversion and allow for a significant reduction in the size of tanks required. The low solubility of oxygen in water limits the extent of the oxidation process, and, therefore, an oxygen source may be required to drive the process to produce nitrogen oxy-anions. The oxidized ammonia may form nitrite or nitrate, depending on the pH of the solution, the oxidant, and other chemical species in the background chemical matrix. Under such a reaction, the net effect is that a cation (ammonium ion) is consumed and an anion (nitrite or nitrate) is produced with a loss of two proton equivalents. The reaction may lower the pH if no base is added. Thus, pH may be controlled by limiting the extent of the ammonia oxidation and using the absorbed ammonia as the base. The pH may further be controlled by adding an external base.

In some embodiments, a base may be added. Equation (7) illustrates the effect of the addition of an exemplary base, potassium. Other bases may be used depending on the desired composition of the final product. The reactions may produce a solution that contains ammonium ions, nitrogen oxy-anions, and cations which originate from the added base. A concentrated solution of nitrogen may be recovered as a byproduct in some embodiments. For example, a 1,000 to 170,000 mg/L concentrated solution of nitrogen may be recovered. The ratio of ammonium to oxy-anions may be controlled by the addition of the external base.

In accordance with an aspect, there is provided a method of producing treated gas by removing nitrogenous compounds from a gas stream. The method may result in a reduction of ammonia emissions, for example, those typically produced during anaerobic digestion of organic material, into the environment. In some embodiments, the treated gas may comprise less than 1% of one or more of phosphate, potassium, nitrogen, and sulfur. For example, the treated gas may be substantially free of nitrogen, sulfur, phosphate, and potassium. The treated gas may comprise less than 0.1%, 0.01%, 0.01% or 0.001% nitrogen, sulfur, phosphate, and potassium. In some embodiments, methods disclosed herein may remove at least 80%, at least 85%, at least 90%, at least 95%, at least 99%, at least 99.9%, at least 99.99%, or at least 99.999% of ammonia emissions from the gas stream. The treated gas may conform to environmental standards and be safe for release to the atmosphere. In some embodiments, the treated gas may be post-treated to meet requirements for a specific use.

In accordance with an aspect, there is provided a method of producing treated gas by removing nitrogenous compounds from a gas stream. The method may comprise introducing a gas stream comprising nitrogenous compounds into a nitrogenous liquid comprising a salt of ammonia. The nitrogenous compounds may be absorbed by the liquid stream according to equation (2) above.

In some embodiments, the method may comprise producing the nitrogenous liquid by contacting the gas stream with water to oxidize at least a fraction of the nitrogenous compounds into the salt of ammonia. The gas stream may be combined with water according to equation (1) above. Upon contact, the water may absorb and dissolve the nitrogenous gas, thereby producing aqueous nitrogenous gas. The gas stream may be introduced into water, for example, in a gas-liquid contactor or other chamber.

The method may comprise introducing an oxidant into the nitrogenous liquid to produce oxy-anions of nitrogen. The nitrogen oxy-anions may comprise nitrite and nitrate. The ions and nitrogenous liquid may be produced according to equations (3) through (6) above. Specifically, nitrite ions may be produced from oxygen and ozone according to equations (3) and (5), respectively. Nitrate ions may be produced from oxygen and ozone according to equations (4) and (6), respectively. The oxidant may be introduced into the nitrogenous, for example, in a tank, gas-liquid contactor, or other chamber. Upon contact, the nitrogen species in the nitrogenous liquid may absorb the oxidative compounds from the oxidant stream forming the oxy-anions of nitrogen in solution. The treated gas may be discharged comprising a reduced concentration of the nitrogenous compounds. The treated gas may be released to the environment, collected, or processed for further use.

The gas stream may continue to be introduced into the nitrogenous liquid, now comprising oxy-anions. Upon contact, the nitrogen species in the nitrogenous liquid may absorb the nitrogenous compounds from the gas stream continually forming nitrogenous liquid and treated gas. The treated gas may be released to the environment, collected, or processed for further use. In some embodiments, the treated gas may comprise less than 1% contaminants. For example, the treated gas may comprise less than 1% any one or more of nitrogen, phosphate, and potassium. The treated gas may comprise less than 1% of any other species added to the nitrogenous liquid, for example in the base or a salt.

The nitrogenous liquid may comprise ammonium, as shown in equation (2) above. The ammonium may be a byproduct of the combination of nitrogenous gas with water. The extent of capture of nitrogenous compounds from the gas stream may be controlled by the concentration of ammonia in the water. As shown in equations (1) and (2), aqueous ammonia gas is produced by contacting the gas stream with water. The aqueous ammonia is in equilibrium with ammonium and hydroxide ions. The nitrogenous liquid may comprise an ammonium salt solution, produced by controlling the pH and oxidation of the nitrogenous liquid. In some embodiments, ammonia, being a weak base, may be added to alter pH of the nitrogenous liquid. In some embodiments, a base may be introduced to supplement the concentration of ammonium in the nitrogenous liquid. For example, a base may be externally added to further enhance capture of nitrogenous compounds from the gas stream into the nitrogenous liquid. Making a change to the pH may generally modify the concentration of oxy-anions of nitrogen, as shown in equations (3) through (6) above.

In accordance with certain embodiments, methods disclosed herein may comprise drying organic material to produce the gas stream comprising nitrogenous compounds. Organic material, for example, moist manure, may be introduced into a dryer. The organic material may be dried, evaporating moisture and ammonia from the manure and producing an ammonia gas stream. The gas stream may be rich in moisture and ammonia. In some embodiments, heat applied during drying may sterilize infectious agents in the organic material. However, non-live contaminants may be released into the gas stream, for example, the gas stream may comprise solid particles such as dust and other volatiles. The contaminants, for example, solids, may be separated from the gas stream. In some embodiments, the contaminants are separated from the gas stream and discarded.

The organic material may comprise, for example, poultry manure or poultry litter, which are known to comprise high concentrations of nitrogenous compounds. In some embodiments, the poultry manure or poultry litter may comprise chicken manure or chicken litter. Poultry may generally refer to domestic fowl. In some embodiments, poultry may comprise wild game birds. Poultry manure or litter may comprise chicken, turkey, goose, duck, swan, quail, ostrich, or pigeon manure or litter, and combinations thereof. The organic material may comprise animal manure or litter, for example, of any domesticated or farm animal. The organic material may additionally or alternatively comprise certain sewage sludge and food waste, for example, produce waste. The sewage sludge and food waste may be utilized when it meets necessary parameters, for example, comprises a sufficient concentration of nitrogenous compounds. Methods disclosed herein may comprise collecting manure, litter, sewage sludge, or food waste. Methods may comprise processing manure, litter, sewage sludge, or food waste to produce an organic material.

In some embodiments a solids separation process may be employed to remove solids from influent gas streams. For instance, dust and other contaminants present in the gases treated and collected may be separated and/or removed from the gas stream. The particle removal process may comprise a wet scrubber where a liquid solution is put in contact with the gas to capture the dust particles. Heat may be added to maintain the temperature of the vapors in the range of between about 20° C. to 150° C. and minimize condensation of vapors. In certain embodiments, no return of solids to the reaction tank would take place.

The organic material drying process may include a thermal drying or biodrying process, where wet hot gases laden with ammonia and other nitrogenous compounds may be generated. When employing a burner or material dryer, it may be required to control the temperature of the process. Excessively hot gases tend to limit the absorption of compounds in water. Without controlling the temperature of the gases, treated air produced may contain an undesirably high concentration of contaminants due to the reduced absorption of acidic compounds. Furthermore, reduced absorption of acidic compounds may limit absorption of ammonia and production of a suitable product. Conventional burners or dryers produce hot gases with temperatures reaching 900 to 1500° F. (about 482° C. to 815° C.). Without reducing the temperature of these gases, they may transfer heat at about 296,000 J/mol S to the aqueous solution. Due to the batch nature of conventional systems, excess heat tends to accumulate in the system creating high liquid solution temperatures that limit the dissolution of gases, especially at high ionic strength concentrations. Heat from burners and heat from hot influent gases must be properly managed.

Systems and methods disclosed herein may employ temperature control mechanisms. High temperatures generally inhibit the dissolution of gases in liquids. Any one or more of the following mechanisms may be employed to control temperature.

In accordance with certain embodiments, water may be evaporated using the latent heat of vaporization of water and removal of water vapors along the rest of treated gases. In some embodiments, active heat exchange may be employed for removal of heat from hot input gases, for example, the nitrogenous gas stream. Temperature may be controlled by inducing evaporation or condensation of water from or into the system. Water may be used to cool liquids and gases by evaporation until a desirable working temperature is reached. Make up water may be added as needed to replace the water evaporated and the water removed from the system as liquid effluent. Furthermore, temperature control by evaporation and condensation of water may be used in accordance to certain embodiments to simultaneously control dissolved solids concentrations beyond what was previously possible, for example, thereby recovering energy and producing a commercial fertilizer from nitrogen emissions that might otherwise contribute to environmental pollution.

In some embodiments, active heat exchange may be employed directly from absorption and/or reaction chambers. Active or passive heat exchange may be employed to transfer heat between various components of a system, for example, between a reaction chamber and an organic material dryer. The temperature may be controlled by adding or removing heat to the liquid using a heat exchanger. The heat exchanger may convey heat from one fluid or gas, for example, burner or dryer gases, to another fluid or gas.

Accordingly, methods disclosed herein may comprise maintaining a temperature of the nitrogenous liquid between about 4° C. and about 80° C. The temperature of the process may be controlled to below about 80° C., below about 70° C., below about 60° C., below about 50° C., below about 40° C., below about 30° C., below about 20° C., below about 15° C., below about 10° C., or below about 5° C. In some embodiments, methods may comprise maintaining a temperature of the nitrogenous liquid at about 4° C., 5° C., 10° C., 15° C., 20° C., 25° C., 30° C., 35° C., 40° C., 45° C., 50° C., 55° C., 60° C., 65° C., 70° C., 75° C., or 80° C. Such temperatures may enhance or promote the absorption of gases into the liquids.

The method of producing a treated gas by removing nitrogenous compounds may comprise maintaining a predetermined pH value of the nitrogenous liquid. In some embodiments, maintaining a predetermined pH comprises measuring the pH of the nitrogenous liquid and making a change responsive to the pH measurement. Making a change to the pH may include introducing a predetermined amount of oxidant to modify the pH of the solution. The conversion of nitrogenous compounds to oxy-anions of nitrogen generally tends to lower the pH of the solution. To increase the pH of the solution, either aeration may be reduced, for example, to reduce oxy-anion formation while ammonia absorption is increased or maintained constant. Ammonia absorption may be most effective at pH values between about 3 and about 9.

Figure 1C:
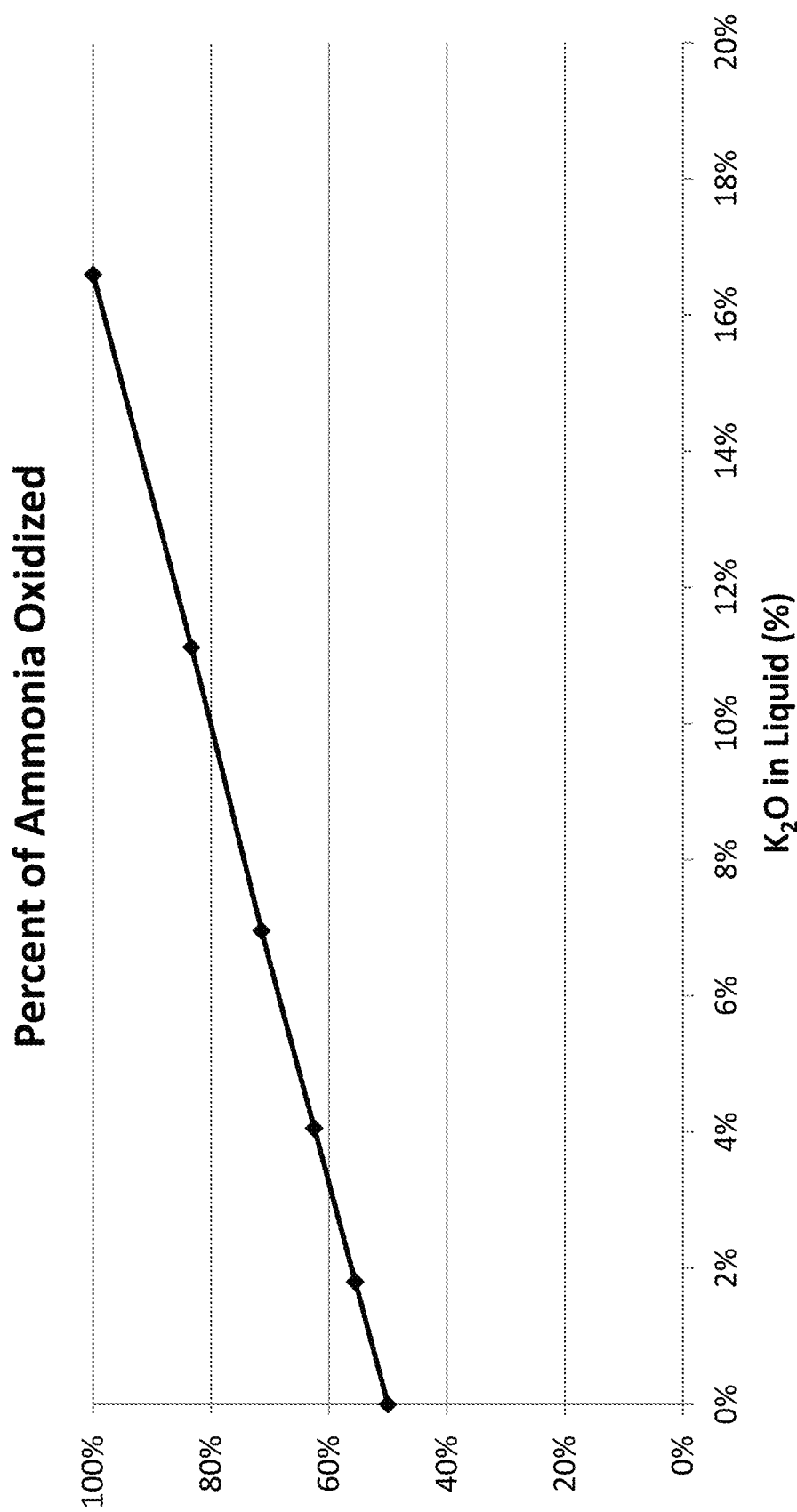
FIG. 1C is a graph of ammonia oxidation as a function of $K_2O$ concentration in liquid.

In some embodiments, the change may include adding a base, for example, a predetermined amount of a base, to modify the pH of the solution. The method may further comprise introducing a base into the nitrogenous liquid. The base may alter the concentration of ammonium ions, according to equation (2) above. The extent of ammonia oxidation to produce oxy-anions of nitrogen, such as nitrite or nitrate, may be controlled by controlling the addition of a base to keep the pH of the solution at a desirable level for the oxidation reaction to occur. As shown in FIGS. 1A through 1C, potassium base may be added to control the pH. The percentage of the ammonia oxidized from the nitrogenous gas may be controlled by adding different amounts of the potassium base. When there is no addition of potassium base, the oxidation of ammonia is controlled to 50%. By adding the potassium base, increasing amounts of ammonia may be oxidized up to 100% and converted to oxy-anions of nitrogen. The amount of base added may be selected to correlate with a desired percent conversion of ammonia to oxy-anions, as shown in FIG. 1C. For example, in some embodiments, 2% potassium oxide ($K_2O$) may convert 56% of the ammonia, 4% $K_2O$ may convert 63% of the ammonia, 7% $K_2O$ may convert 71% of the ammonia, 11% $K_2O$ may convert 83% of the ammonia, and 17% $K_2O$ may convert 100% of the ammonia.

The pH may be controlled to a predetermined value selected from a pH range between 3 and 9. The pH of the solution may be controlled or altered by introducing nitrogenous gas or a salt of ammonia into the solution. The pH of the solution may be maintained at the desired set point by adding controlled amounts of an oxidant and a base. Maintaining the desired pH by the addition of the base and oxidant may enable control of the extent of the ammonia conversion. The acidity resulting from the ammonia oxidation may be neutralized by absorbing more ammonia into the ammonia solution, by adding a salt of ammonia, and/or by adding a base, for example, as illustrated in Equations (2) to (7) above.

In some embodiments, methods may comprise maintaining a predetermined pH of the nitrogenous liquid between about 3 and about 9, between about 5 and about 7, between about 5 and about 6, between about 6 and 8.5, or between about 6.7 and 8.1. In some embodiments, methods disclosed herein may comprise maintaining a pH of the nitrogenous liquid above 3, above 4, above 5, above 6, above 7, or above 8. Methods may comprise maintaining a pH of the nitrogenous liquid below 9, below 8, below 7, below 6, below 5, or below 3. In some embodiments, the predetermined pH is about 3, about 4, about 5, about 6, about 7, about 8, or about 9. The predetermined pH may generally correlate with the desired conversion of nitrogenous compounds to oxy-anions, i.e. with the desired concentration of oxy-anions of nitrogen in the nitrogenous liquid.

Methods disclosed herein may further comprise diluting the nitrogenous liquid and oxy-anions with water. The nitrogenous liquid may be diluted, for example, to compensate for evaporated liquid. The nitrogenous liquid may be diluted by adding water or inducing condensation of evaporated liquid. The pH of the solution may be adjusted according to certain embodiments by diluting the nitrogenous liquid. Diluting the nitrogenous liquid may serve to alter the temperature of the solution. Diluting the nitrogenous liquid may also serve to alter a concentration of oxy-anions or other anions in the liquid, for example, by reducing a concentration of ions. The lower concentration of ions in solution may enhance nitrogenous compound absorption in the nitrogenous liquid. The lower concentration of ions may also prevent precipitation of ions.

In some embodiments, conductivity of one or more process liquids may be measured. Upon reaching a threshold conductivity, one or more of the process liquids may be diluted to maintain the conductivity within a working range. The value of the threshold conductivity may generally vary with certain parameters. For example, the threshold conductivity may be a factor of the quality of the gas stream, the water, or the composition of the added base, oxidant, and/or salt. In some embodiments, the threshold conductivity may be a factor of the quality or composition of the organic material or the drying process. The threshold conductivity may be between about 200 µS and about 2000 µS, between about 2000 µS and about 20000 µS, between about 20 thousand µS and about 200 thousand µS, or between about 200 thousand µS and about 1.2 million µS.

In accordance with another aspect, there is provided a method of recovering nitrogenous compounds from a gas stream. The nitrogenous compounds, for example ammonia and other nitrogen-containing species, may be recovered from a gas stream to produce an organic product. In some embodiments, the nitrogenous compounds are recovered to produce fertilizer. The fertilizer may be a liquid fertilizer comprising nitrogenous compounds. In some embodiments the fertilizer may comprise ammonium crystals. Methods of recovering nitrogenous compounds from a gas stream and methods of producing a fertilizer may comprise introducing the gas stream into water to produce a nitrogenous liquid. In embodiments, for example, where the gas stream is produced from organic material, fertilizer produced by such methods as described herein may be organic fertilizer, for example, for use on organic farms.

Methods and systems disclosed herein may produce an organic product, for example, a certified product suitable for organic farming. Certification may be dependent on the quality of the starting material. In some embodiments, the starting material (i.e. gas stream, oxidant, and base) is compliant with organic certification, and produces a certified organic product. Specifically, such fertilizer products produced by the disclosed methods may not require artificially added materials. Fertilizer products produced by the disclosed methods may comply with requirements outlined by the Organic Materials Review Institute (OMRI). In some embodiments, methods and systems disclosed herein may produce a fertilizer product comprising at least 16% nitrogen by mass.

Methods disclosed herein may comprise introducing an oxidant into the nitrogenous liquid to produce oxy-anions of nitrogen. The oxidant may be introduced to oxidize a predetermined amount of the nitrogenous compounds to nitrogen ions. The oxidant may comprise oxygen, ozone, hydrogen peroxide, or a halogen. In some embodiments, introducing an oxidant comprises contacting the nitrogenous liquid with air. Aqueous ammonia may partially oxidize to produce nitrate and nitrite according to equations (3) through (6) above. Oxidation to nitrogen ions will generally lower the pH of the solution by exchanging a weak acid for a strong acid. Controlling oxidation conditions may also provide for a more stable product, for example, by inhibiting the formation of odorous and corrosive compounds in the final product. Controlling dissolved solid concentrations and oxidation reactions may provide for operation in pH ranges that favor operational and capital costs of investment.

The oxidation reactions may be inhibited by a high concentration of dissolved ions in solution. Dilution water may be added to reduce inhibition. For example, makeup water may be added to replace liquid lost in the process and/or to dilute the ammonium salt solution in order to avoid inhibition effects on the rate of oxidation. The dilution water may be recirculated from a downstream process to reduce environmental impact of the process. When dilution water is added, the product may later be concentrated using several alternative means of removing water from the solution to produce a concentrated liquid fertilizer.

As disclosed herein, oxidation may comprise partial oxidation and need not be a complete conversion of ammonia to ionic species. Oxidation may be controlled by the amount of oxidant supplied to the liquid solution. In some embodiments, an oxidant is introduced in a controlled amount to achieve a desired conversion. For example, oxidation may be controlled to oxidize between about 5%-50% of the nitrogenous compounds, for example, by controlling supply of the oxidant to the liquid solution. Oxidation may be controlled to between about 5%-40%, 5%-30%, 5%-20%, 5%-15%, 5%-10%, 10%-15%, 10%-20%, 10%-30%, 10%-40%, or 10%-50%. Oxidation may be controlled to less than 5%, less than 10%, less than 15%, less than 20%, less than 25% conversion, less than 30% conversion, less than 35% conversion, less than 40% conversion, less than 45% conversion, or less than 50% conversion. The extent of conversion may be controlled as required by design of the final fertilizer product. In some embodiments, a fraction of the nitrogenous liquid is oxidized.

In some embodiments, the method may comprise introducing a base into the water or nitrogenous liquid. The base may be a weak or strong base, as required to control oxidation or pH of the process solutions. The base may be a salt of a base, for example, as shown in equation (7), above. Generally, oxidation of the nitrogenous compounds to oxy-anions of nitrogen may be controlled up to 50% conversion without externally adding a base. As shown in FIG. 1C, without adding the potassium dioxide, about 50% of nitrogenous compounds were oxidized. The method may comprise oxidizing between about 50% and about 100% of the nitrogenous compounds by addition of varying amounts of a base. In some embodiments the base may comprise potassium, for example potassium hydroxide or potassium dioxide. The base may comprise any one or more of lithium, sodium, potassium, rubidium, cesium, magnesium, calcium, strontium, and barium. The base may comprise or be associated with a weak base element, for example, ammonia, carbon, nitrogen, oxygen, fluoride, phosphorus, sulfur, chloride, bromide, and iodine.

In some embodiments, the base may be prepared by introducing a salt into water to produce a salt solution. Ions in the salt solution may be electrically separated, for example in an electrodialysis process, to produce a cation stream and an anion stream. The cation stream may be employed as the base, such that the cation stream may be introduced into the nitrogenous liquid as needed. The anion stream may be employed in a separate process to produce a treated gas and nitrogenous liquid from a nitrogenous gas, as conventionally practiced. The specific salt may be selected to control composition of the final fertilizer product.

The concentration of the final ions in solution may be controlled by employing dilution of process liquids with water. In some embodiments, process liquids may be diluted or evaporated to induce formation of crystals. In some embodiments, methods disclosed herein comprise maintaining a concentration of total dissolved solids (TDS) in the nitrogenous liquid below about a threshold concentration to avoid the formation of crystals. For example, the concentration of TDS may be maintained below about 35%, 40%, 41%, 42%, 43%, 44%, 45%, 46%, 47%, 48%, 49%, or 50% (m/v). In some embodiments, methods comprise maintaining a concentration of TDS above the threshold concentration to induce formation of crystals. For example, methods may comprise maintaining a concentration of TDS above about 46%, 47%, 48%, 49%, 50%, or 55% (m/v). The threshold concentration will generally be dependent on the composition of the nitrogenous liquid. The oxidant, base, and/or salt added may dictate the threshold concentration to avoid formation of crystals. In some embodiments, for example, wherein the nitrogenous liquid comprises sulfur species, the threshold concentration is 46% (m/v). For example, methods disclosed herein may comprise maintaining a concentration of TDS between about 1 g/L and about 500 g/L. In some embodiments, the method comprises collecting the nitrogenous liquid, the crystals, or both.

The crystals may further be processed as a final product. For example, the crystals may be processed as a solid fertilizer. The solid product may comprise at least 15%, 16%, 17%, 18%, 19%, 20%, 21%, 22%, 23%, 24%, or 25% nitrogen by mass. In some embodiments, the solid product may comprise less than 1% phosphate and potassium. The solid product may be substantially free of phosphate and potassium. For example, the solid product may comprise less than 0.1%, 0.01%, 0.01% or 0.001% phosphate and potassium.

The nitrogenous liquid may further be processed as a final product. The method may comprise collecting a liquid product comprising at least a fraction of the nitrogenous liquid, remaining nitrogenous compounds (for example, nitrogenous compounds that have not been oxidized), and the oxy-anions of nitrogen. The liquid product may be processed as a liquid fertilizer.

In some embodiments, the method may comprise concentrating the liquid product by removing excess water. The excess water may be removed by a concentrating process, for example, reverse osmosis, electrodialysis, or evaporation. In embodiments where the liquid product is concentrated, the method may comprise returning at least a fraction of the excess water removed from the product to the nitrogenous liquid. The excess water may be returned to control a concentration of components in the nitrogenous liquid, for example, oxidant, base, or TDS. The excess water may be returned to control pH of the nitrogenous liquid, as needed.

In some embodiments, the liquid product or concentrated liquid product comprises at least 16% nitrogen by mass. The liquid product or concentrated product may comprise at least 4%, 5%, 6%, 7%, 8%, 9%, or 10% nitrogen by mass. The quality of the liquid product may be controlled by controlling the temperature, for example, to increase absorption of nitrogenous species in water or the nitrogenous liquid. The quality of the liquid product may be controlled by maintaining a pH between about 3 and about 9, for example maintaining a pH higher than 5. The pH may generally alter the composition of the solution, by pushing the reaction of equation (2) forwards or backwards or by driving the reactions of equations (2) through (6). Additionally, the quality of the liquid product may be controlled by controlling addition of an oxidant (ORP of the solution), for example, to maintain balance of nitrogenous compounds and oxy-anions of nitrogen in the solution. In some embodiments, the nitrogenous liquid and/or liquid product may comprise less than 1% phosphate and potassium. The nitrogenous liquid and/or liquid product may be substantially free of phosphate and potassium. For example, the nitrogenous liquid and/or liquid product may comprise less than 0.1%, 0.01%, 0.01% or 0.001% phosphate and potassium.

In some embodiments, methods may comprise dosing the nitrogenous liquid with a biological catalyst. In accordance with certain embodiments, a naturally occurring microbial culture may be employed to enhance the oxidation of nitrogenous compounds. Process liquids may be dosed with biological catalyst, for example a microbial or enzymatic organism. The microbial or enzymatic organism may comprise bacteria and/or archaea. Catalysis may be accomplished by retaining the biological organisms catalyzing the oxidation in the reaction tank where oxygen is supplied. The pH may be controlled between about 6 and 8.5, for example, between about 6.7 and 8.1, to allow growth, proliferation, and catalysis of the biological organisms. Once the organisms grow and are established in the system, they may be separated out of the final liquid and/or solid product. In accordance with certain embodiments, the separated biological organisms may be returned back to the reaction tank to enhance the culture, further speeding the oxidation reaction. In some embodiments, methods may comprise separating solids from the nitrogenous liquid or liquid product. The solids may contain biological organisms and/or crystallized or precipitated components of the product.

Methods disclosed herein may comprise controlling a composition of the nitrogenous liquid. The concentrations of the different ions in solution may be controlled or designed to produce a final fertilizer product which meets specifications as dictated by market demand. In some embodiments, the composition of the nitrogenous liquid may be controlled by introducing a salt into the water or nitrogenous liquid. For example, the product may be combined with a salt. Ions, for example, as a cation hydroxide, may be added to the reaction during a gas absorption process in a liquid. In some embodiments, a salt of a cation hydroxide may be added to the product in a post-treatment step.

In some embodiments the liquid product may be concentrated by removing water from the solution, for example, using a dissolved solids concentration. The water removed from the liquid effluent stream may be recirculated back as dilution water to minimize the use of external dilution water. In some embodiments, the dissolved solids concentration may be an evaporation process. In other embodiments, the concentration may be a reverse osmosis process. In yet other embodiments, the concentration may be an electrodialysis process. Other dissolved solids concentration processes can be employed.

In accordance with yet another aspect, there is provided a system for removing nitrogenous compounds from a gas stream. The system may comprise a gas stream (for example, a gas stream comprising nitrogenous compounds), a source of water, a source of an oxidant, and a source of a base. The system may further comprise a reaction subsystem comprising at least one absorption chamber. The system may further comprise an oxidation control subsystem, a dissolved solids concentrator, and a recirculation line.

The system for removing nitrogenous compounds from a gas stream may comprise a source of a gas stream, for example, wherein the gas stream comprises nitrogenous compounds. The source of the gas stream may provide a process gas from organic material. For instance, the source of the gas stream may comprise an organic material dryer. The organic material dryer may be configured to receive liquid organic material, for example manure, and evaporate moisture and/or ammonia from the organic material, producing a gas stream. In some embodiments, the gas stream is fluidly connectable to the reaction subsystem. The organic material dryer may be fluidly connectable to the reaction subsystem.

The system may further comprise a solids-gas separator comprising a solids waste outlet and a gas outlet. The solids-gas separator may comprise, for example, an air filter or a multicyclone separator. The solids-gas separator may be configured to remove dust and other contaminants from one or more gas streams within the system. In some embodiments, the solids-gas separator may be positioned along the gas stream, for example, downstream from the source of the gas stream. The gas stream may be fluidly connectable to the reaction subsystem through the gas outlet of a solids-gas separator. In some embodiments, the system comprises a solids-gas separator downstream from the reaction subsystem, configured to remove contaminants from the treated air. Any waste collected through the solids waste outlet of the separator may be discarded.

The system may comprise a source of water. The source of water may be fluidly connected to the reaction subsystem. In some embodiments, the source of water comprises one or more pre-treatment units configured to remove contaminants from the water. In some embodiments, the water is fluidly connectable to the reaction subsystem, for example, through one or more pre-treatment units.

The system may comprise a source of an oxidant. The source of the oxidant may be configured to provide an oxidant to the reaction subsystem. The source of the oxidant may be a source of air, oxygen, ozone, hydrogen peroxide, or a halogen, for example, a gas tank or an air blower. In some embodiments, the source of the oxidant comprises an aeration vent. The source of the oxidant may comprise one or more pre-treatment units configured to remove contaminants from the oxidant. In some embodiments, the oxidant is fluidly connectable to the reaction subsystem, for example, through one or more pre-treatment units.

The system may comprise a source of a base. The source of the base may be configured to provide a base to the reaction subsystem. The source of the base may comprise an acid base production subsystem, such that the source of the base may receive a salt of a base and water, and discharge a cation stream and an anion stream. The acid base production subsystem may be constructed and arranged to introduce salt into the water and electrically separate ions in the salt solution to produce the basic stream (cation stream) and an acidic stream (anion stream). In some embodiments, the acid base production subsystem comprises an ion exchange separation device or an electrically driven membrane separation device, for example, an electrodialysis unit.

The acid base subsystem may have a salt inlet, a water inlet, a cation stream outlet, and an anion stream outlet. The acid base production subsystem may be fluidly connectable to the reaction subsystem, such that the cation stream may be conveyed to the reaction subsystem. The acid base production subsystem may further be fluidly connectable to a second reaction subsystem, such that the anion stream may be conveyed to a second reaction subsystem comprising at least one absorption chamber, a treated gas outlet, and a product outlet. The second reaction subsystem may be constructed and arranged to combine a as stream comprising nitrogenous compounds with the anion stream and water to produce a treated gas and nitrogenous liquid, for example, according to conventional methods in the art.

The source of the base may further comprise one or more pre-treatment units configured to remove contaminants from any one or more of the base, the salt, the water, the anion stream, or the cation stream. In some embodiments, the base is fluidly connectable to the reaction subsystem, for example, through one or more pre-treatment units. The salt or the water may be fluidly connectable to the acid base production subsystem through one or more pre-treatment units. The anion stream may be fluidly connectable to the second reaction subsystem through one or more pre-treatment units.

In some embodiments, the system may comprise a source of a salt. The source of the salt may be fluidly connectable to the reaction subsystem. The source of the salt may comprise a mixing chamber. For example, the source of the salt may comprise a mixing chamber constructed and arranged to combine the salt with water or with nitrogenous liquid. The source of the salt may be positioned upstream or downstream from the reaction subsystem. In some embodiments, the source of the salt may be configured to introduce the salt into water upstream of the reaction subsystem. The source of the salt may comprise one or more pre-treatment units configured to remove contaminants from the salt. In some embodiments, the salt is fluidly connectable to the reaction subsystem, for example, through one or more pre-treatment units.

In some embodiments, the system comprises a reaction subsystem fluidly connectable to the gas stream, the source of the water, the source of the oxidant, the source of the base, and the source of the salt. It is to be understood that the reaction subsystem is fluidly connectable to any one or more of the above-mentioned fluids simultaneously, selectively, or exclusively. The reaction subsystem is generally fluidly connected to any one or more of the above-mentioned fluids during operation. The reaction subsystem may be constructed and arranged to combine the gas stream, the water, the oxidant, the base, and the salt. The reaction subsystem may comprise at least one absorption chamber, wherein one or more of the gases and liquids are combined within the absorption chamber. In some embodiments, the absorption chamber may comprise a gas-liquid contactor. The gas-liquid contactor may introduce a gas into a liquid (for example, the gas stream, or the oxidant) by dispersing the gas with a fine mist of solution or by flowing the gas though a volume of solution. The gas-liquid contactor may be a differential gas-liquid contactor or a stagewise gas-liquid contactor. The absorption chamber may comprise one or more of a gas sparger, a gas-liquid column (for example, a falling-film column, a packed column, a bubble column, or a plate column), a spray tower, an agitated vessel, a scrubber, a rotating disc contactor, a Venturi tube, a dispersion tube, or any other vessel configured to contact a gas and a liquid. The reaction subsystem may comprise at least one of a treated gas outlet and a product outlet. The reaction subsystem may further comprise at least one of a gas inlet and a liquid inlet.

The system for removing nitrogenous compounds from a gas stream may comprise a wet electrostatic precipitator positioned within the at least one absorption chamber. The wet electrostatic precipitator may be employed to prevent precipitation and/or aerosolization of product gas within the absorption chamber. The prevention of precipitation and/or aerosolization may limit and/or control unwanted byproducts from exiting the system. In some embodiments, the wet electrostatic precipitator may improve a yield of ammonia in the product by controlling undesired precipitation and/or aerosolization of the product.

Figure 2:
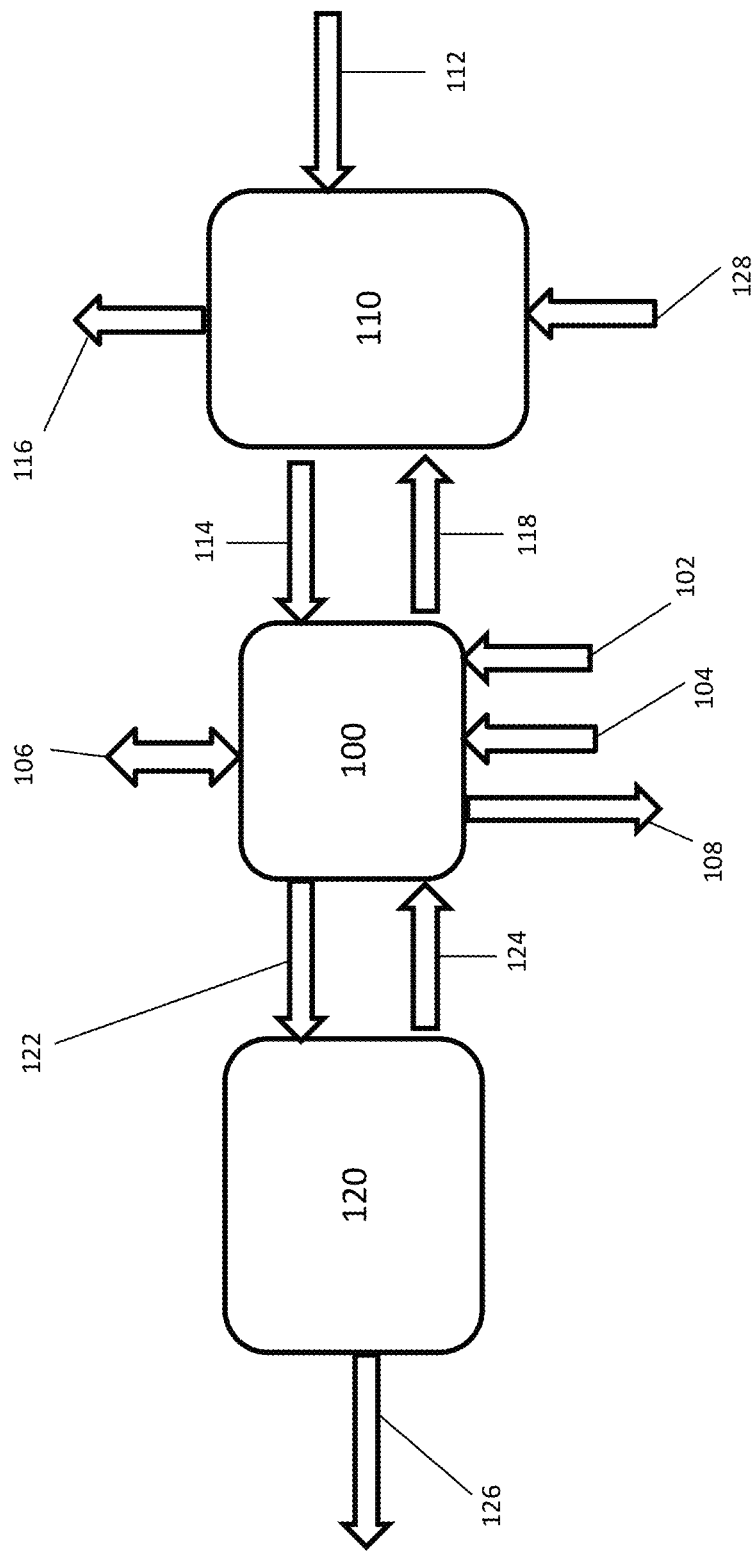
FIG. 2 is a box diagram of a system for removing nitrogenous compounds from a gas stream, according to one embodiment.

In some embodiments the reaction of the nitrogenous gases with water, oxidant, and base take place in one chamber, while in other embodiments the reactions take place in separate chambers. The separate chambers may comprise one or more lines between them, configured to transport one or more gas, liquid, or solution from one chamber to another. For example, as shown in FIG. 2, the absorption chamber and reaction chamber may be fluidly connected by lines configured to transport liquid ammonium salt and return fluid between them. The one or separate chambers may comprise one or more recirculation lines.

The reaction subsystem may comprise one or more bioreactors. In some embodiments, the reaction subsystem comprises a bioreactor containing biological reaction catalyzing organisms. The bioreactor may be constructed and arranged to contact the biological organisms with the one or more process solutions to enhance oxidation. In some embodiments, reactions are catalyzed by the biological organisms in an absorption or reaction chamber.

The system for removing nitrogenous compounds from a gas stream may comprise a dissolved solids concentrator. The dissolved solids concentrator may be fluidly connectable downstream of the reaction subsystem through the product outlet. The dissolved solids concentrator may employ one or more of reverse osmosis (RO), ion exchange, electrodialysis (ED), evaporation, or other similar process to separate dissolved solids from a liquid product. The dissolved solids concentrator may comprise a product outlet and a dilute liquid outlet. The product may be further processed for use, for example, as fertilizer.

In some embodiments, the dissolved solids concentrator may comprise an evaporator. A fraction of the liquid effluent may be conveyed from the absorption or reaction chamber to the evaporator. In the evaporator, liquid may further be concentrated, producing two streams: a vapor stream and a concentrated liquid stream. Heat recovered from another component of the system, for example, a burner or dryer, may be used to offset some or all of the heat demand of the evaporator.

The system for removing nitrogenous compounds may comprise a recirculation line. In some embodiments, the recirculation line may extend between the dissolved solids concentrator through the dilute liquid outlet and a recycle inlet of the reaction subsystem. The recirculation line may be constructed and arranged to reintroduce dilute liquid from the dissolved solids concentrator to the reaction subsystem. In some embodiments, the dilute liquid outlet is fluidly connectable to a bioreactor in the reaction subsystem. The system for removing nitrogenous compounds may comprise more than one recirculation line, for example, a network of recirculation lines, extending between different components of the system.

The recirculation line may provide further control of the concentration of the TDS throughout the process. Liquid from the absorption chamber or reaction chamber may be conveyed to the dissolved solids concentrator, for example, to an evaporator, to adjust the solids concentration within the dissolved solids concentrator. Where the liquid is conveyed to an evaporator, the concentrated liquid may then be conveyed to a solids-liquid separation unit to remove excess solids from the liquid fraction. The liquid fraction may be used as a product or returned to the absorption or reaction chamber. In some embodiments, dilute liquid may be conveyed to the reaction subsystem. The dilute liquid may be conveyed to a bioreactor within the reaction subsystem to control the TDS concentration. In this embodiment, the system could produce a dilute liquid product or a concentrated product by controlling the operating conditions.

The system for removing nitrogenous compounds may comprise an oxidation control subsystem. The oxidation control subsystem may be configured to maintain a predetermined oxidation reduction potential (ORP) within the reaction subsystem. In some embodiments, the oxidation control system may comprise ORP sensor configured to measure ORP of a solution within the reaction subsystem. One or more setting may be adjusted manually or automatically upon measuring an ORP that requires adjustment. The system may further comprise a control module electrically connected to the ORP sensor. The control module may be configured to adjust the ORP within the reaction subsystem, for example, manually or automatically, responsive to a measurement obtained by the ORP sensor. The control module may be configured to provide more or less oxidant to the reaction subsystem, to adjust the ORP therein.

In some embodiments, the predetermined ORP is between about +400 mV and about +900 mV. The predetermined ORP may be between about +200 mV and about +1200 mV, between about +400 mV and about +1000 mV, between about +500 mV and about +700 mV, between about +400 mV and about +600 mV, between about +500 mV and about +800 mV, or between about +600 mV and about +900 mV. The predetermined ORP may be about +400 mV, about +500 mV, about +600 mV, about +700 mV, about +800 mV, or about +900 mV. The predetermined ORP may be less than about +900 mV, less than about +800 mV, less than about +700 mV, less than about +600 mV, less than about +500 mV or less than about 400 mV. In some embodiments, the predetermined ORP may be more than about +400 mV, more than about +500 mV, more than about +600 mV, more than about +700 mV, more than about +800 mV, or more than about +900 mV.

The system for removing nitrogenous compounds from a gas stream may comprise a solids-liquid separator. The solids-liquid separator may employ one or more of sedimentation, filtration (for example, nanofiltration, microfiltration, ultrafiltration, or another membrane filtration), centrifugation, evaporation, or other similar process to separate suspended solids from a liquid product. The solids-liquid separator may be fluidly connected downstream of the reaction subsystem through the product outlet. The dissolved solids concentrator may be fluidly connected to the solids-liquid separator through the liquid product outlet. The solids-liquid separator may be configured to separate the reaction subsystem product into a liquid product and a stream comprising solids.

In some embodiments, the solids-liquid separator employs filtration (for example by size, charge, or density) to separate a liquid fraction from solids. In some embodiments, the solids-liquid separator employs sedimentation (for example, comprising a clarifier or thickener) to separate a liquid fraction from solids. The solids-liquid separator may comprise a solids outlet and a liquid product outlet. The liquid product may comprise nitrogenous liquid fertilizer. The liquid product may be further processed for use, for example, as a fertilizer.

The system may comprise a solids recirculation line extending from the solids outlet of the solids-liquid separator and the reaction subsystem. Some of the solid fraction may be returned to the reaction chamber, while some of the solid fraction may be removed from the system as waste. In some embodiments, the solid fraction comprises essentially only dust particles collected from incoming gases. In such embodiments, no solid is generally returned to the reaction subsystem. In some embodiments, for example, in embodiments where the system employs biological organisms to catalyze oxidation reactions, the solids retained may comprise biological flocs of organisms. The biological flocs may be returned to the reaction subsystem to further catalyze oxidation reactions. In some embodiments, the solids may comprise crystals of ammonium salts, or other precipitates, such as calcium sulfate or iron oxides, formed from elements present in the water and the absorbed gases. The nature of the solids separated will generally depend on the design and operational conditions of the system and method. The composition of the solid and/or liquid product may be controlled by adding salts to the process liquids.

In some embodiments, the system comprises a temperature sensor. The temperature sensor may be configured to measure temperature of one or more gases or solutions within the system. For example, the temperature sensor may be configured to measure temperature of the solutions within the reaction subsystem or of the gas stream. One or more setting may be adjusted manually or automatically upon measuring a temperature that requires an adjustment.

The system may comprise a control module electrically connected to the temperature sensor. The control module may be configured to maintain a predetermined temperature range, as previously described herein, within the reaction subsystem. In some embodiments, the control module may be configured to adjust a temperature within the reaction subsystem, for example, manually or automatically, responsive to a measurement obtained by the temperature sensor. In some embodiments, the predetermined temperature range is between about 4° C. and about 80° C.

The system for removing nitrogenous compounds may comprise a temperature control subsystem. The system may employ active or passive heat transfer to control the temperature. In some embodiments, the system comprises a chiller or a heater. The system may further be configured to provide heat to the source of the gas stream, for example, for example, to burn dry organic material. The system may comprise a heat exchanger constructed and arranged to transfer heat between the reaction subsystem and one or more of the source of the gas stream, the source of the water, or the source of the oxidant. The heat exchanger may employ mechanisms to diffuse heat within the system, for example, to conserve heat energy. In some embodiments, the heat exchange is employed to adjust a temperature within the reaction subsystem to a working temperature, as previously described herein. In some embodiments, the heat exchanger may be configured to adjust the temperature within the reaction subsystem to between about 4° C. and about 80° C.

In some embodiments, the system may comprise a pH meter configured to measure pH of a solution within the reaction subsystem. One or more setting may be adjusted manually or automatically upon measuring a pH that requires an adjustment. The system may comprise a control module electrically connected to the pH meter. The control module may be configured to adjust pH within the subsystem, for example, manually or automatically, responsive to a measurement obtained by the pH meter. The pH may be adjusted as required by addition of an acid or a base, by adjusting a concentration of oxidant within the system (for example, increasing or decreasing aeration), by altering a concentration of nitrogen oxy-anions within the reaction subsystem, or by dilution or evaporation of a solution within the system.

The control module may be configured to adjust pH to a value as previously described herein. For example, in some embodiments, the control module may be configured to maintain a pH between about 3 and about 9, maintain a pH between about 5 and about 7, maintain a pH between about 6 and about 8.5, or maintain a pH between about 6.7 and about 8.1. In some embodiments, a pH may be maintained between 4-5, 4-6, 4-7, 4-8, 4-9, 5-6, 5-7, 5-8, 5-9, 6-7, 6-8, 6-9, 7-8, 7-9, or 8-9. The control module may be configured to maintain a pH correlated to a desired concentration of nitrogen oxy-anions in solution, for example, as shown in FIGS. 1A-1C. In some embodiments, the pH may be selected such that solution contains at least 50% of the aqueous ammonium is oxidized. The pH may be selected such that at least 55%, 60%, 65%, 70%, 75%, 80%, 85%, 90%, 95%, 99%, or 100% of the aqueous ammonium is oxidized to oxy-anions of nitrogen. The selection of pH will generally depend on the desired composition of the final product.

In some embodiments, the system may comprise a conductivity meter. The conductivity meter may be configured to measure conductivity of a gas or solution within the reaction subsystem. One or more settings may be adjusted manually or automatically upon measuring a conductivity that requires adjustment. The system may comprise a control module electrically connected to the conductivity meter. The control module may be configured to adjust the conductivity of the gas or the solution within the reaction subsystem, for example manually or automatically, responsive to a measurement obtained by the conductivity meter. In some embodiments, the control module may adjust conductivity by adjusting one or more of pH, temperature, concentration of ions (for example, by adding a salt), concentration of an oxidant, or concentration of a base in the reaction subsystem.

In accordance with certain embodiments, the control module may be configured to maintain a predetermined concentration of TDS in the solution within the reaction subsystem. For instance, the control module may be configured to maintain a concentration of TDS below a threshold concentration to avoid formation of crystals. The control module may be configured to maintain a concentration of TDS in the solution within the reaction subsystem above a threshold concentration to induce formation of crystals. The threshold concentration may be selected based on the composition of the solution, which in turn may generally depend on selection of the base and/or salt to be added. The composition of the final product may be controlled or designed for a particular use by selecting the base and/or salt. In some embodiments, the control module may adjust a concentration of TDS within the reaction subsystem by adjusting one or more of pH, temperature, concentration of ions, concentration of an oxidant, or concentration of a base in the reaction subsystem.

In accordance with certain embodiments, evaporation and condensation of water may be controlled, which may have an impact on the concentration of dissolved ions in solution. A net evaporation system can be designed and operated where heat is removed from the system as latent heat in the water vapor is removed with the treated gases. In such embodiments, make up water may be added periodically or as-needed to control the concentration of ions in solution and make up for any additional losses in the liquid product. Evaporation and condensation may generally take place in an absorption chamber (see, for example, FIGS. 2-11) simultaneously with the gas absorption.

A net condensing system may be designed and operated in accordance with certain embodiments. Heat may be removed from the system using heat exchangers to extract heat from the absorption chamber, for example, as presented in FIGS. 2-11. Water may be condensed from the influent gases containing ammonia, further adding heat. In some embodiments, the amount of condensed water is in excess of the water needed for the product. In such embodiments, no make-up water may be necessary. Additionally, the final concentration ions in the liquid product might be too low, potentially necessitating an additional concentration or separation step to concentrate the product solution (see, for example, FIGS. 2, 4-6, and 8-11). In such embodiments, the evaporator may be run to induce crystallization of ammonium species, which can be removed from solution in a solid liquid separation step.

The system for removing nitrogenous compounds may comprise a plurality of channels extending between separate components of the system for delivering gases and solutions between the components of the system. The system may comprise one or more pumps, blowers, or fans to drive gases and solutions within the system. The system may further comprise one or more tanks for holding gases or solutions, for example, product tanks for holding liquid product and/or product comprising solids.

A box drawing of an exemplary system for the removal and/or recovery of nitrogenous compounds in accordance with one or more embodiments is presented in FIG. 2. Gas containing nitrogenous compounds is introduced into an absorption chamber and put in contact with water to produce a liquid containing ammonium salts. In one embodiment, the absorption chamber may be a spray tower as presented in FIG. 3. The pH of the nitrogenous liquid in the reaction subsystem may be controlled as previously described, for example, to a pH between about 4 and 9, to control the rate of oxidation of the nitrogenous compounds, as previously described.

In the reaction subsystem an oxidant, such as air or hydrogen peroxide, may be introduced. The oxidant may convert ammonium ions, formed by the reaction of nitrogenous gas with water according to equations (1) and (2). The liquid containing ammonium salts may be conveyed from the absorption chamber to the reaction subsystem, while liquid from the reaction subsystem with nitrogen oxy-anions may be returned to the absorption chamber via a recirculation line. The acidity resulting from the presence of nitrogen oxy-anions ions may be neutralized by the nitrogenous compounds as presented in equations (3)-(6) above or by addition of the base, as presented in equation (7) above.

The base, for example, a cation hydroxide, may be produced by the combination of a salt of the base and water in an acid-base production chamber. The base may be conveyed to the reaction subsystem to be combined with the nitrogenous liquid, as presented in equation (7) above. The acid stream may be used to treat additional nitrogenous gas, as conventionally practiced in the art. Water vapor may either be condensed into or removed from the liquid depending on the operation of the unit for temperature and control of TDS. Ammonia may be absorbed into the liquid stream and treated gas may be released from the first absorption chamber. Heat might be added to or removed from the absorption chamber in order to control the temperature of the liquid. A recirculation line from a reaction subsystem may provide fresh pH-controlled solution and remove nitrogenous solution from the absorption chamber.

The temperature of the hot gases may be reduced by water evaporation. Make up water may be added to maintain the concentration balance of the solution. The total dissolved solids concentration can be controlled to avoid crystallization of ammonium species, or to induce crystallization of ammonium species. In one embodiment the absorption chamber may be a spray tower, as presented in FIG. 3, but other gas liquid absorption devices can be used.

In some embodiments the circulating liquid may also contain a microbial culture that enhances the rate of oxidation of ammonium ions to oxy-anions using, for example, oxygen, nitrates, iron, or manganese compounds as oxidants. The ratio of ammonium ions to oxy-anions may be controlled by adjusting a concentration of oxidant in the liquid.

Figure 8:
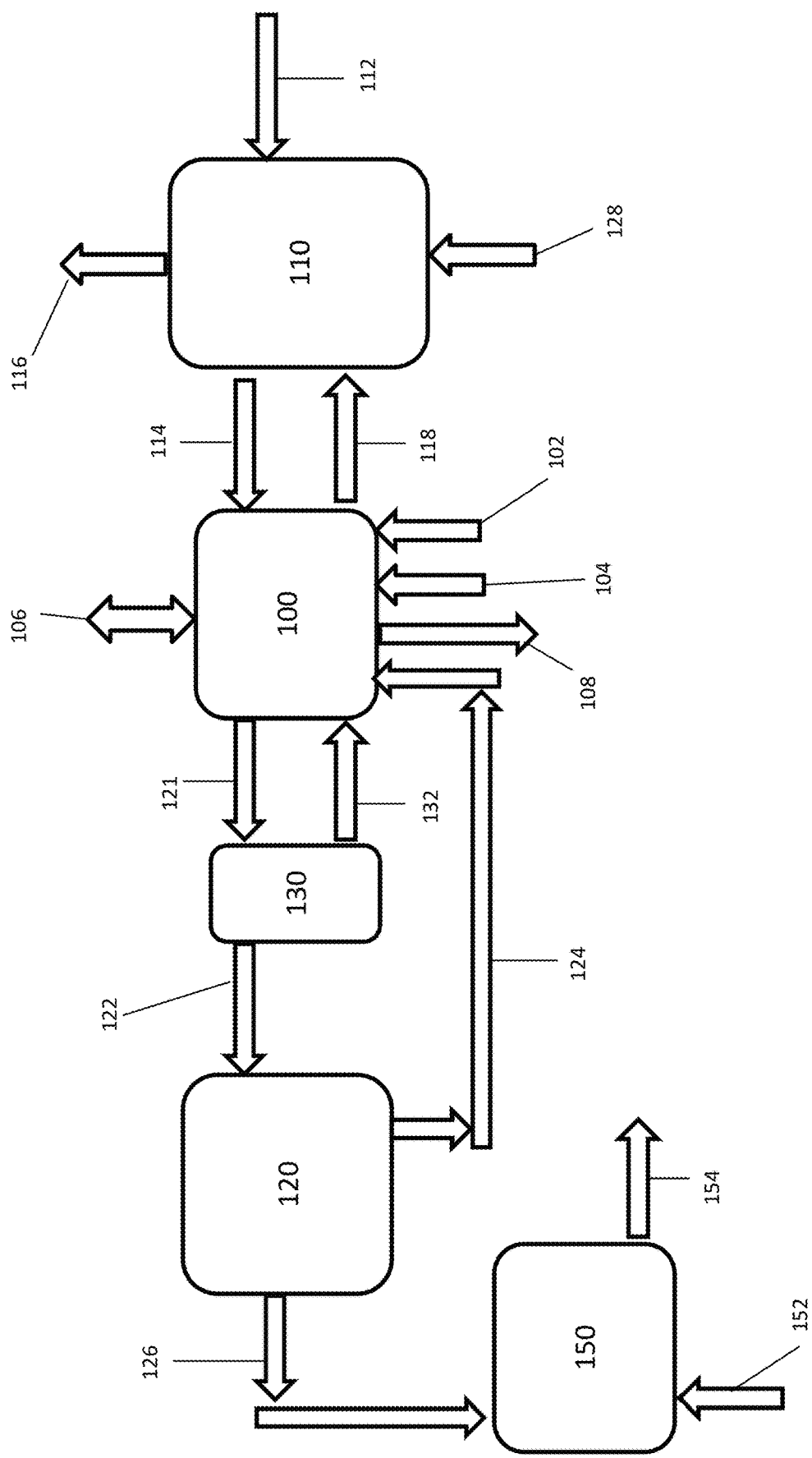
FIG. 8 is a box diagram of an alternate embodiment of a system for removing nitrogenous compounds.

A salt may be introduced into the nitrogenous liquid. The composition of the final product may be designed or controlled by addition of one or more external salts. In some embodiments, for example, as shown in FIG. 8, the salt may be introduced in a post-processing mixer. In some embodiments, the salt may be introduced into the reaction subsystem.

Heat may be added or removed from the reaction subsystem, for example, for the purpose of controlling the temperature of the process. The treated and cooled dryer gas after removal of the majority of the nitrogenous compounds may be conveyed out of the absorption chamber. Any water vapor formed during the evaporation of the liquid may be removed with the remaining gas. A liquid effluent stream with the neutralized ammonium ions may be withdrawn from the reaction subsystem as the fertilizer product.

The gas stream containing the nitrogenous compounds may be conveyed to a particle removal process for treatment to remove dust particles entrained in the gas. In one embodiment, the particle removal process comprises a wet scrubber where a liquid solution may be put in contact with the gas to capture the dust particles. Heat may be added to maintain the temperature of the vapors in the range of between about 20° C. to about 150° C. and minimize condensation of vapors. In some embodiments, when the gas containing the nitrogenous compounds is hot, water evaporation may be used to cool down the gases.

FIG. 2 presents one embodiment of the invention. A schematic of an exemplary system for the recovery of nitrogenous compounds in the form of a liquid product is shown in FIG. 2. Gas containing nitrogenous compounds 112 may be introduced into an absorption chamber 110 and put in contact with water 128. The mixture, a liquid containing ammonium salts 114, may be put in contact with a base 102 and/or an oxidant 104. Heat 106 may be added or removed from one or more components of the system. Heat 106 may be added or removed from the system using a heat exchanger (shown in FIG. 11) or by evaporating or condensing water in the system to control temperature. Liquid exchange 118 may be transferred between an absorption chamber 110 and a reaction chamber 100. The treated gas 116 with most of the ammonia removed may be conveyed out of the absorption chamber 110. Excess solids 108 may be conveyed out of the system. In some embodiments, liquid product 122 may be transferred to a dissolved solids concentrator 120 to remove dilution water 124 and produce a concentrated product 126. Dilution water 124 may be recycled to other components of the system. Make-up water 128 may be added to components of the system as necessary.

Figure 3:
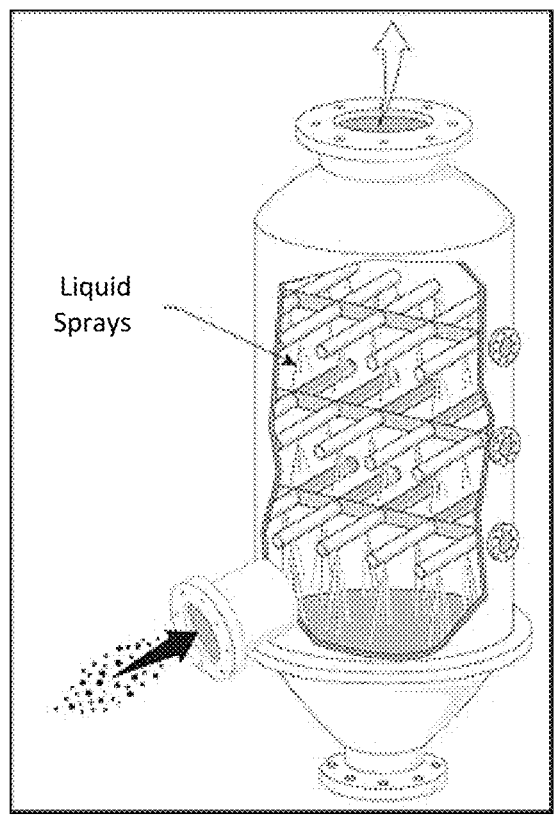
FIG. 3 is a schematic diagram of an absorption chamber, according to one embodiment.

In some embodiments the absorption chamber may be a spray tower as presented in FIG. 3. Other gas reaction chambers, for example, scrubbers can be used.

Figure 4:
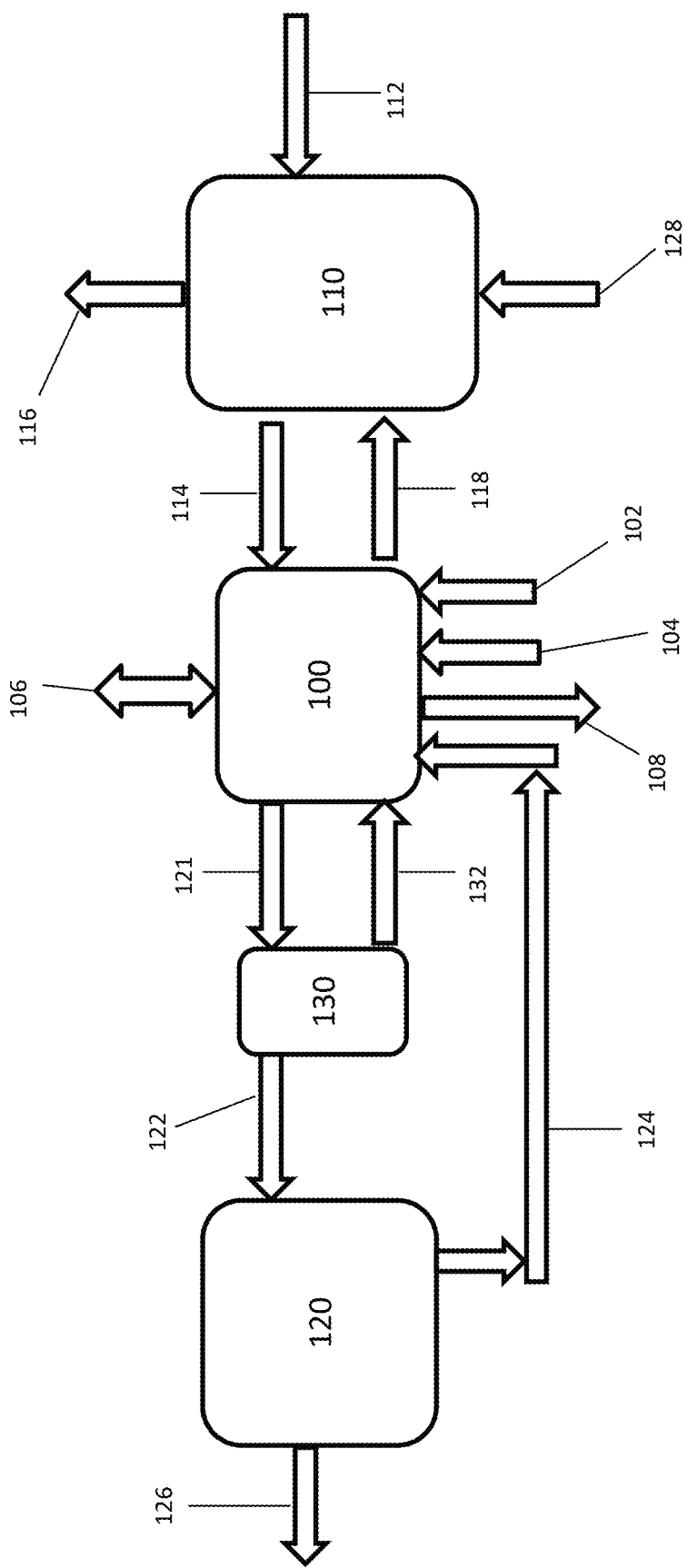
FIG. 4 is a box diagram of an alternate embodiment of a system for removing nitrogenous compounds.

FIG. 4 illustrates an alternative embodiment. In the exemplary embodiment of FIG. 4 a solids-liquid separator 130 may be coupled to the reaction chamber 100 before the liquid product 122 is conveyed to the dissolved solids concentrator 120. This configuration may be employed, for example, when the oxidation reaction of ammonia is catalyzed by microorganisms. The liquid product 121 after reaction may be conveyed to the solids-liquid separator. The liquid product 122 after removal of the solids in suspension may be used directly or conveyed to a dissolved solids concentrator 120. The stream containing separated solids 132 may be returned to the reaction chamber.

Figure 5:
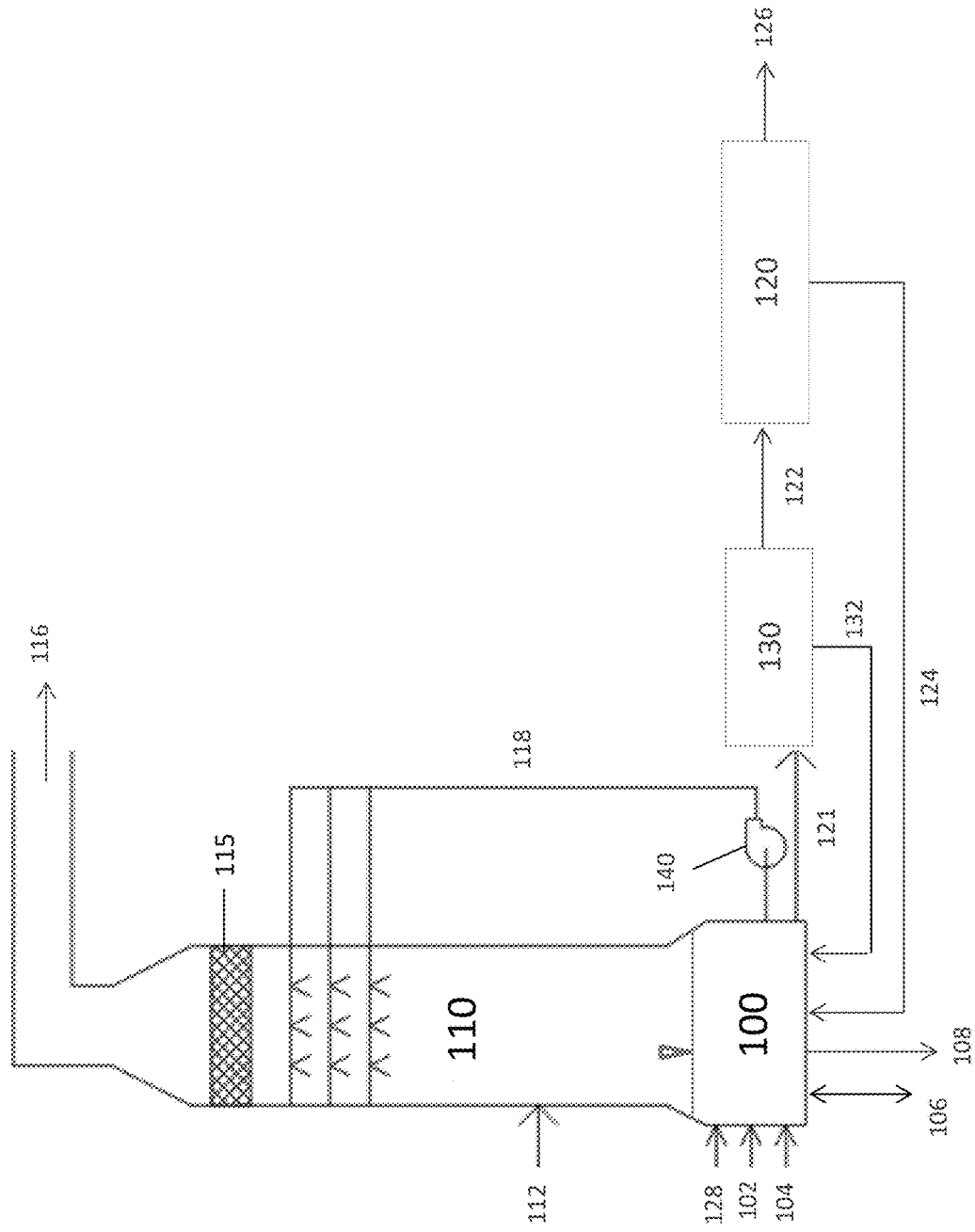
FIG. 5 is a schematic diagram of an absorption chamber, according to another embodiment.

FIG. 5 illustrates another embodiment. In the embodiment of FIG. 5 the absorption chamber 110 and reaction chamber 120 may be independent compartments of one vessel. For example, in the embodiment illustrated in FIG. 6, the absorption and reaction chambers may be combined in one chamber 105. The vessel of FIG. 5 is an exemplary vessel comprising a spray tower absorber in the upper chamber and a reaction tank in the lower chamber. The vessel may comprise a mist eliminator 115. The system may include one or more pumps 140.

Figure 6:
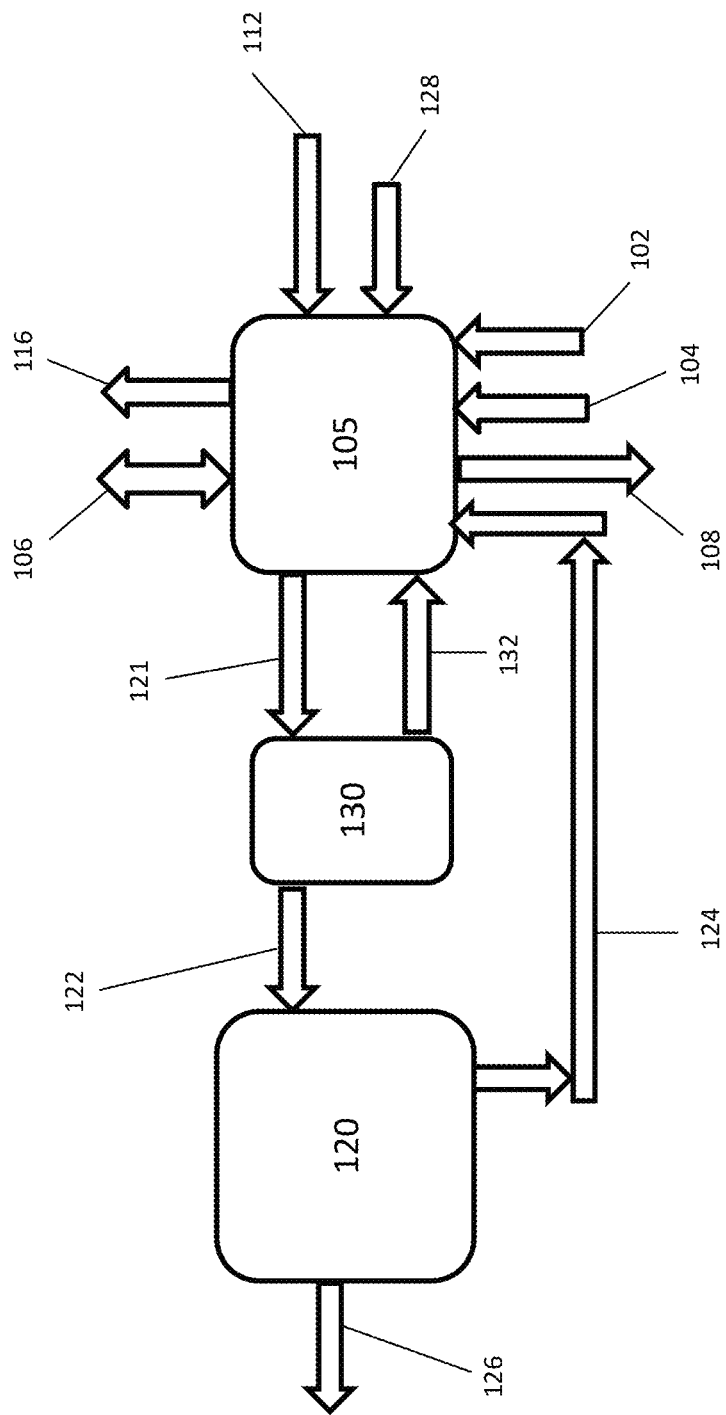
FIG. 6 is a box diagram of an alternate embodiment of a system for removing nitrogenous compounds.
Figure 7:
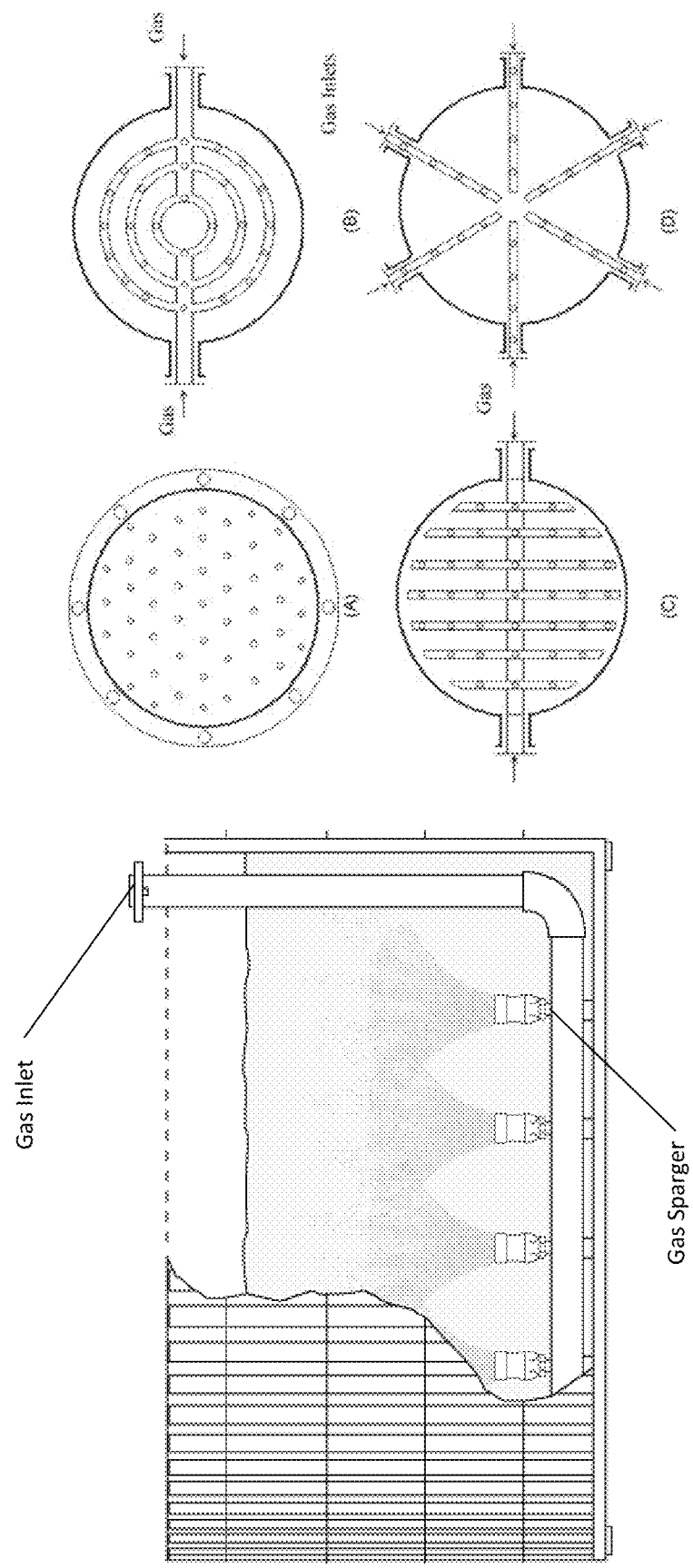
FIG. 7 is a schematic diagram of an absorption chamber, according to another embodiment.

FIG. 7 illustrates one embodiment of the combined absorption reaction chamber. In the exemplary embodiment of FIG. 7 a tank containing the reaction liquid mixture with submerged gas spargers is used. Fine bubbles of the gas are created by the gas spargers, inducing absorption of the gas in the liquid while the conversion reactions occur in the liquid, for example, according to Equations (1) to (7) above. The gas forms bubbles that move through the liquid transferring some or all of its gaseous content to the liquid. The gases not absorbed in the liquid may be removed from the vessel. Some of the liquid contents evaporate and escape with the effluent gases. In some embodiments, some of the vapors of the sparged gas condense adding additional liquid to the vessel. The gases dissolved in the liquid may react with the liquid contents. As illustrated in FIG. 6, an optional solid-liquid separation step may be included to remove suspended material prior to introducing the liquid product in a dissolved solids concentrator.

FIG. 8 illustrates another embodiment of a system for recovering nitrogenous compounds from a gas stream. In the exemplary embodiment of FIG. 8 the concentrated liquid product 126 after the dissolved solids concentrator 120 may be combined with a salt 152 in a mixing chamber 150. In some embodiments, no base is added to the reaction chamber 100 and, instead, the salt of the base 152 may be added in the mixing chamber 150, as required to control the composition of the final product 154.

Figure 9:
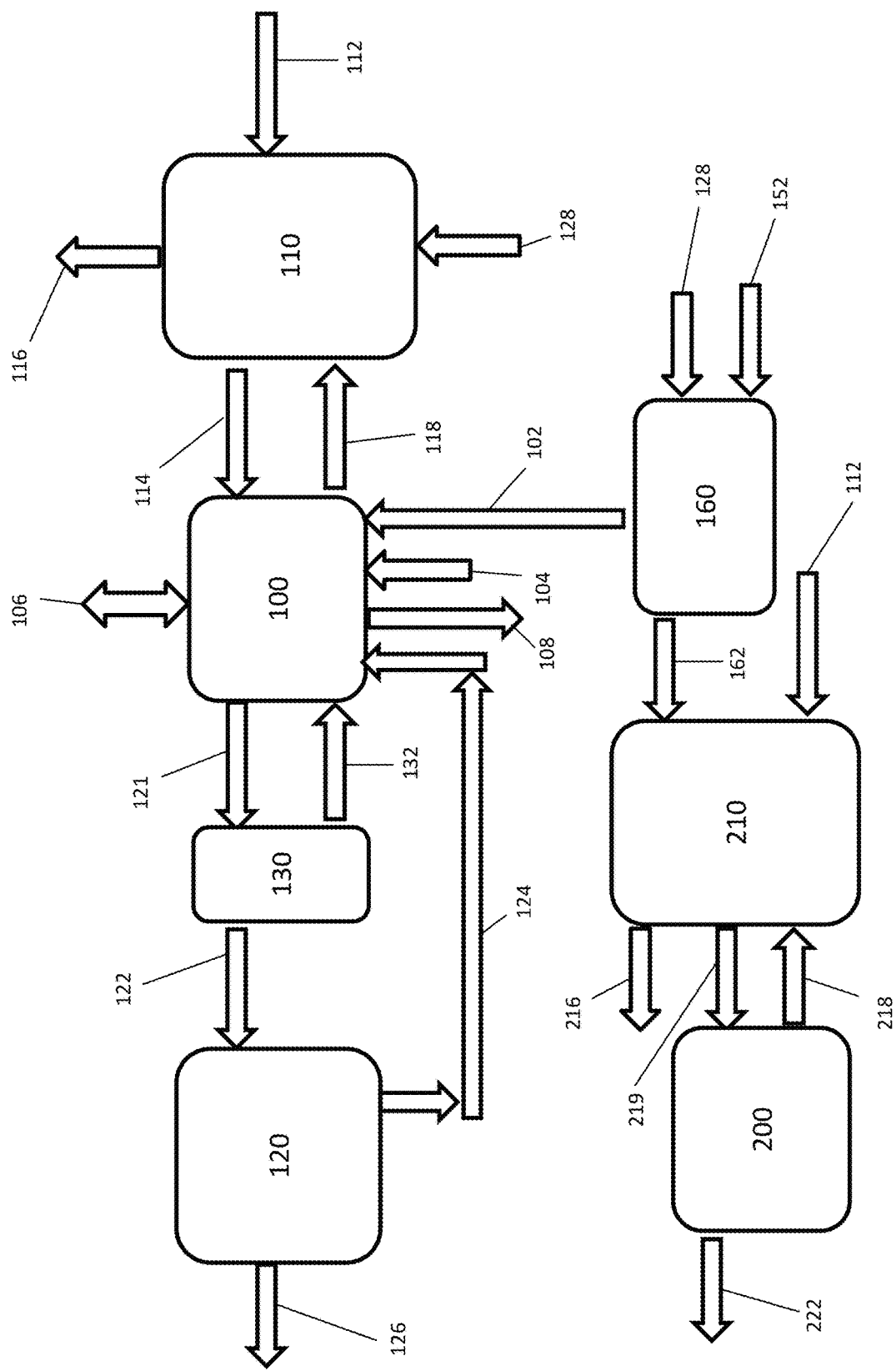
FIG. 9 is a box diagram of an alternate embodiment of a system for removing nitrogenous compounds.

FIG. 9 illustrates another embodiment. In the exemplary embodiment of FIG. 9, the process employs an acid base production chamber 160. The cation stream from the acid base production may be introduced into the reaction chamber 100 as the base 102. The anion stream may be used as an acid 162 to capture ammonia from the nitrogenous gas stream 112 in a second absorption chamber 210. The second absorption chamber 210 may produce a second treated gas 216. Liquid exchange 218, 219 from the second absorption chamber 210 may be conveyed to a second reaction chamber 200. The second absorption chamber 210 may be combined with the second reaction chamber 200 to produce a second liquid product 222. This arrangement may employ the use of a salt 152 for capturing nitrogenous compounds as needed, to produce the desired final product.

Systems may comprise a plurality of channels extending between separate components of the system for delivering gases and solutions between the components of the system. The system may comprise one or more pumps, blowers, or fans to drive gases and solutions within the system. The system may further comprise one or more tanks for holding gases or solutions, for example, product tanks for holding liquid product and/or product comprising solids.

Figure 10:
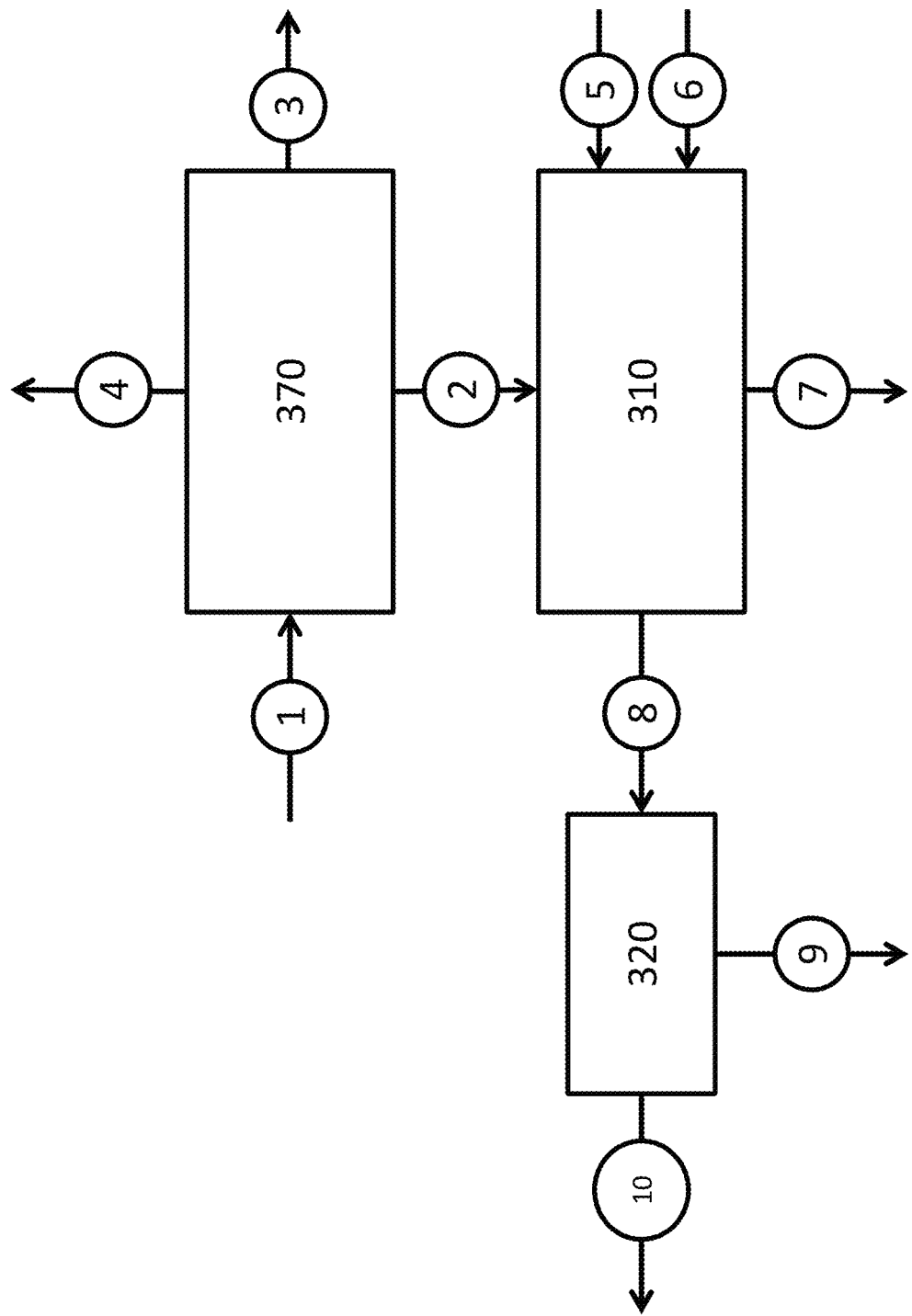
FIG. 10 is a flow diagram of a method for removing nitrogenous compounds from a gas stream, according to one embodiment.

FIG. 10 illustrates an exemplary embodiment for a method of removing nitrogenous compounds from a gas stream. The exemplary embodiment of FIG. 10 illustrates a method where organic material feed 1 is dried 370 to produce a dried organic material 3 and a gas stream 2. Contaminants 4 are removed from the organic material gas stream 2. In the exemplary embodiment of FIG. 10, an oxidant (for example, oxygen) 5 and water 6 are combined 310 with the gas stream 2. A dilute liquid product 8 containing nitrogenous compounds is produced by the combination 310. Treated vapors 7 are also produced by the combination 310. The dilute liquid product 8 is concentrated 320 to remove a dilute liquid return 9 and produce a concentrated nitrogenous product 10.

Figure 11:
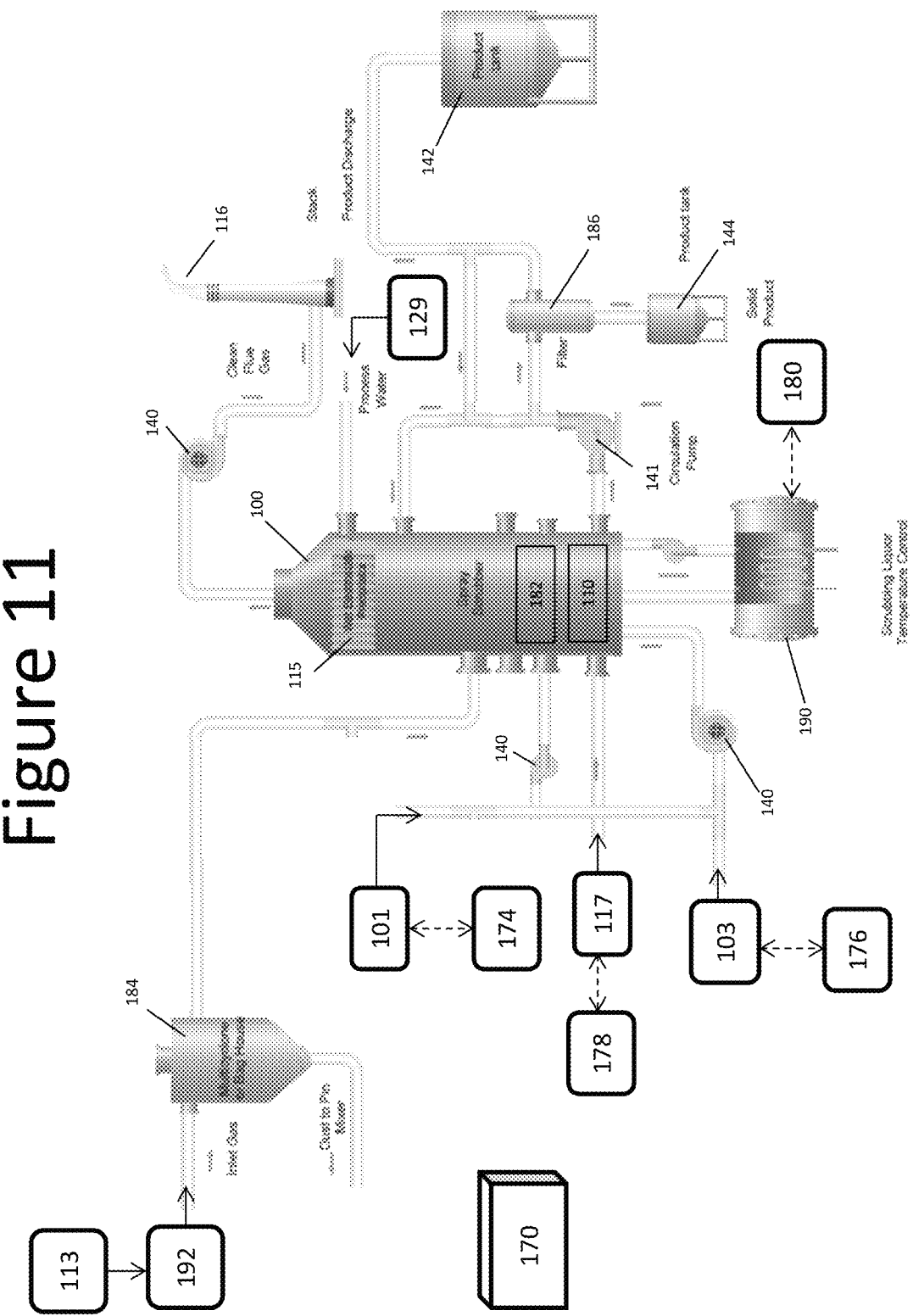
FIG. 11 is a schematic diagram of a system for removing nitrogenous compounds, according to one embodiment.

FIG. 11 illustrates another embodiment of a system. The exemplary embodiment of FIG. 11 includes a spray scrubber with an absorption chamber 100 and reaction chamber 110. The spray scrubber includes a wet electrostatic precipitator 115 as a mist eliminator. In the exemplary embodiment of FIG. 11 nitrogenous flue gas is produced by drying organic material 113 (exemplary source of gas stream) in a dryer 192. Solid contaminants may be removed from the gas stream with a multicyclone 184 (an exemplary solids-gas separator). The gas stream may be combined with water 129 (exemplary source of water). A base 101 (exemplary source of a base) and an oxidant 103 (exemplary source of an oxidant) may be introduced into the spray scrubber. The base, oxidant and gas stream may be combined in the absorption and reaction chambers 100, 110 with dilution water. A salt 117 (exemplary source of a salt) may be added to the solution, depending on the desired composition of the final product.

A temperature unit 190 with control subsystem 180 may provide temperature control to the system. An oxidation control subsystem 176 may provide oxidation control to the system. Other control subsystems 174 and 178 may provide pH control and ion concentration control, respectively. A sensor or meter 182 (for example, temperature sensor, pH meter, ORP sensor, or conductivity meter) may be configured to take measurements within the spray scrubber, for example within absorption chamber 100. A control module 170 may be electrically connected to the sensor or meter 182, for example via one or more wires (not shown) or wirelessly. Liquid product may be removed from the scrubber and filtered, for example in filter 186, to produce a concentrated liquid product and remove excess solids. The concentrated product may be stored in a tank 142. The concentrated product may be stored, used, or processed for further use. The excess solids may be stored in a tank 144 or returned to the reaction chamber 110. Dilute liquid may be circulated in the spray scrubber via a pump 141. Treated air 116 may be discharged through a clean flue gas stack. Several pumps 140, 141 may be employed to direct process gases and air through the system.

Example: Nitrogenous Gas Stream from Chicken Manure

A bench scale test was run to process the manure of chickens. Full scale results were estimated based on results obtained from the bench scale experiment. The results are presented in Table 1 (in tons per day). The full scale results were confirmed in a pilot test processing the manure of two million chickens. The bench scale test was organized and run as shown in FIG. 10.

feed remain in the dried organic product. About 28.4 tons per day are lost during by drying the material. About 5400 tons per day of nitrogenous gas stream are produced by the drying process. The dried product contains about 3.41 tons of nitrogen, indicating that a little less than half of the nitrogen is evaporated to the gas stream during the drying process.

Oxidant is added in a sufficient amount to oxidize 50% of the nitrogen in the dried vapors. The process may be used to recover 2.87 tons of nitrogen per day (0.5% nitrogen) from the gas vapors in the form of a dilute solution. The dilute solution may be concentrated to a 17% nitrogen liquid product. The concentrated product further contains about 8.12 tons per day (49%) of $NH_4NO_2$. The concentrated product contains less than 1% phosphate, potassium, and sulfur. Treated vapors released to the environment contain about 0.55 tons per day of nitrogen. Treated vapors have less than 1% nitrogen, phosphate, potassium, and sulfur. Water

TABLE 1

Chicken Manure

| | Total mass (tpd) | Total Solids (tpd) | Water (tpd) | Total N (tpd) | Phosphate $P_2O_3$ (tpd) | Potassium $K_2O$ (tpd) | Sulfur S (tpd) | $NH_4NO_3$ (tpd) |
|---|---|---|---|---|---|---|---|---|
| Feed (1) | 318.0 | 96 | 222 | 7.30 | 3.40 | 4.80 | 0.3 | 0 |
| Dried Organic Material (3) | 96 | 86 | 9.57 | 3.65 | 3.16 | 4.46 | 0.28 | 0 |
| Loss From Dryer (4) | 28.4 | 6.2 | 22.2 | 0.26 | 0.23 | 0.32 | 0.02 | 0 |
| Gas Stream (2) | 5400 | 4.06 | 190 | 3.41 | 0.034 | 0.030 | 0.001 | 0 |
| Oxidant (as O) (5) | 0 | 6.5 | 0 | 0 | 0 | 0 | 0 | 0 |
| Water (6) | 380 | 0 | 380 | 0 | 0 | 0 | 0 | 0 |
| Treated Vapors (7) | 5205 | 2.34 | 3.19 | 0.55 | 0.03 | 0.01 | — | — |
| Liquid Product (8) | 575 | 8.22 | 567 | 2.87 | — | 0.02 | — | 8.20 |
| Dilute Liquid Return (9) | 559 | 0.08 | 558 | 0.03 | — | 0.0002 | — | 0.08 |
| Concentrated Liquid Product (10) | 16.71 | 8.14 | 8.57 | 2.84 | 0 | 0.0017 | 0 | 8.12 |

The composition of the total solids was made up of suspended solids and dissolved solids as shown in Table 2.

TABLE 2

Total Solids

| | Suspended solids (tpd) | Dissolved Solids (tpd) |
|---|---|---|
| Feed (1) | 88 | 8.2 |
| Dried Organic Material (3) | 81.7 | 4.46 |
| Loss From Dryer (4) | 5.9 | 0.32 |
| Gas Stream (2) | 0.63 | 3.4 |
| Oxidant (as O) (5) | 0 | 6.5 |
| Water (6) | 0 | 0 |
| Treated Vapors (7) | 0.63 | 1.71 |
| Liquid Product (8) | — | 8.22 |
| Dilute Liquid Return (9) | — | 0.08 |
| Concentrated Liquid Product (10) | — | 8.1 |

Briefly, 318 tons per day of wet organic material feed are supplied to the system. The organic material feed contains 7.3 tons of nitrogen. About 96 tons per day of dried organic material is produced from drying the feed. Most of the phosphate and potassium contained in the organic material may be added to the chamber in the case of a biological process to avoid toxic effects of high nitrogen concentrations on the microbial population.

The system may be used for recovering nitrogen from gases containing ammonia to produce a useful product that can be reused in agricultural applications. Furthermore, the systems and processes described herein may produce a treated vapor comprising a high concentration of nitrogen and less than 1% contaminants.

Those skilled in the art should appreciate that the parameters and configurations described herein are exemplary and that actual parameters and/or configurations will depend on the specific application in which the disclosed methods and materials are used. Those skilled in the art should also recognize or be able to ascertain, using no more than routine experimentation, equivalents to the specific embodiments disclosed. For example, those skilled in the art may recognize that the method and components thereof, according to the present disclosure, may further comprise a network or systems or be a component of a system for recovering nitrogen from a gas stream. It is therefore to be understood that the embodiments described herein are presented by way of example only and that, within the scope of the appended claims and equivalents thereto; the disclosed embodiments may be practiced otherwise than as specifically described. The present systems and methods are directed to each individual feature, system, or method described herein. In addition, any combination of two or more such features, systems, or methods, if such features, systems, or methods are not mutually inconsistent, is included within the scope of the present disclosure. The steps of the methods disclosed herein may be performed in the order illustrated or in alternate orders and the methods may include additional or alternative acts or may be performed with one or more of the illustrated acts omitted.

Further, it is to be appreciated that various alterations, modifications, and improvements will readily occur to those skilled in the art. Such alterations, modifications, and improvements are intended to be part of this disclosure, and are intended to be within the spirit and scope of the disclosure. In other instances, an existing facility may be modified to utilize or incorporate any one or more aspects of the methods and systems described herein. Thus, in some instances, the systems may involve recovering nitrogen from a gas stream. Accordingly the foregoing description and figures are by way of example only. Further the depictions in the figures do not limit the disclosures to the particularly illustrated representations.

The phraseology and terminology used herein is for the purpose of description and should not be regarded as limiting. As used herein, the term "plurality" refers to two or more items or components. The terms "comprising," "including," "carrying," "having," "containing," and "involving," whether in the written description or the claims and the like, are open-ended terms, i.e., to mean "including but not limited to." Thus, the use of such terms is meant to encompass the items listed thereafter, and equivalents thereof, as well as additional items. Only the transitional phrases "consisting of" and "consisting essentially of," are closed or semi-closed transitional phrases, respectively, with respect to the claims. Use of ordinal terms such as "first," "second," "third," and the like in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

While exemplary embodiments of the disclosure have been disclosed, many modifications, additions, and deletions may be made therein without departing from the spirit and scope of the disclosure and its equivalents, as set forth in the following claims.

What is claimed is:

1. A method of producing a treated gas by removing nitrogenous compounds from a gas stream produced by an organic material dryer, the method comprising:
   introducing the gas stream comprising nitrogenous compounds and a nitrogenous liquid comprising a salt of ammonia into an absorption chamber;
   introducing an oxidant into the absorption chamber to contact the nitrogenous liquid and produce oxy-anions of nitrogen;
   maintaining the nitrogenous liquid and oxy-anions of nitrogen at a predetermined pH between about 3 and about 9 to control a concentration of the oxy-anions of nitrogen; and
   discharging the treated gas comprising a reduced concentration of the nitrogenous compounds.

2. The method of claim 1, wherein the oxy-anions of nitrogen comprise at least one of nitrite and nitrate.

3. The method of claim 1, further comprising producing the nitrogenous liquid by contacting the gas stream with water to oxidize at least a fraction of the nitrogenous compounds into the salt of ammonia.

4. The method of claim 1, wherein maintaining the predetermined pH comprises introducing a base into the nitrogenous liquid.

5. The method of claim 1, further comprising maintaining a total dissolved solids concentration in the nitrogenous liquid between about 1 g/L and about 500 g/L.

6. The method of claim 1, further comprising dosing the nitrogenous liquid comprising the salt of ammonia with a biological catalyst in a bioreactor fluidly connected to the absorption chamber.

7. The method of claim 1, wherein the predetermined pH is between about 6 and about 8.5.

8. The method of claim 1, further comprising drying organic material to produce the gas stream comprising nitrogenous compounds.

9. The method of claim 8, further comprising separating solids from the gas stream.

10. The method of claim 8, wherein the organic material comprises at least one of poultry manure and poultry litter.

11. The method of claim 8, further comprising maintaining a temperature of the nitrogenous liquid between about 4° C. and about 80° C.

12. The method of claim 1, wherein the treated gas comprises less than 1% nitrogen, sulfur, phosphate, and potassium.

13. A method of recovering nitrogenous compounds from a gas stream, the method comprising:
   introducing the gas stream comprising nitrogenous compounds into a nitrogenous liquid comprising a salt of ammonia;
   introducing an oxidant into the nitrogenous liquid at a controlled rate to oxidize a predetermined amount of the nitrogenous compounds into oxy-anions of nitrogen; and
   collecting a liquid product comprising at least a fraction of the nitrogenous liquid, remaining nitrogenous compounds, and the oxy-anions of nitrogen,
   the predetermined amount being selected to produce the liquid product having a desired composition.

14. The method of claim 13, wherein the predetermined amount of the nitrogenous compounds to be oxidized is between about 5% and about 50% of the nitrogenous compounds.

15. The method of claim 13, wherein the method further comprises introducing a base into the nitrogenous liquid, and the predetermined amount of the nitrogenous compounds to be oxidized is between about 50% and about 100% of the nitrogenous compounds.

16. The method of claim 15, further comprising introducing a salt into water to produce a salt solution and electrically separating ions in the salt solution to produce the base and an acid.

17. The method of claim 13, further comprising producing the nitrogenous liquid by contacting the gas stream with water to oxidize at least a fraction of the nitrogenous compounds into the salt of ammonia.

18. The method of claim 13, further comprising concentrating the liquid product by removing excess water.

19. The method of claim 18, wherein the liquid product is concentrated by at least one of reverse osmosis, electrodialysis, and evaporation.

20. The method of claim 19, wherein the liquid product comprises at least 16% nitrogen by mass.

21. The method of claim 18, further comprising returning at least a fraction of the excess water to the nitrogenous liquid.

22. The method of claim 21, further comprising maintaining a total dissolved solids concentration in the nitrogenous liquid between about 1 g/L and about 500 g/L.

23. The method of claim 13, further comprising maintaining a pH of the nitrogenous liquid and oxy-anions of nitrogen between about 3 and about 9.

24. The method of claim 23, further comprising maintaining a pH of the nitrogenous liquid and oxy-anions of nitrogen between about 6 and about 8.5.

25. The method of claim 13, further comprising separating solids from the liquid product.

26. The method of claim 25, further comprising dosing the nitrogenous liquid with a biological catalyst.

27. The method of claim 26, further comprising returning at least a fraction of the separated solids to the nitrogenous liquid.

28. The method of claim 13, further comprising drying organic material to produce the gas stream comprising nitrogenous compounds.

29. The method of claim 28, further comprising separating solids from the gas stream.

30. The method of claim 28, wherein the organic material comprises at least one of poultry manure and poultry litter.

31. The method of claim 28, further comprising maintaining a temperature of the nitrogenous liquid between about 4° C. and about 80° C.

32. The method of claim 13, further comprising controlling a composition of the nitrogenous liquid by introducing a salt into the nitrogenous liquid.

33. A method of producing a treated gas by removing nitrogenous compounds from a gas stream having a temperature between 482° C. to 815° C., the method comprising:

introducing the gas stream comprising nitrogenous compounds and a nitrogenous liquid comprising a salt of ammonia into an absorption chamber;

maintaining a temperature of the nitrogenous liquid below the temperature of the gas stream, between about 4° C. and about 80° C.;

introducing an oxidant into the absorption chamber to contact the nitrogenous liquid and produce oxy-anions of nitrogen;

maintaining the nitrogenous liquid and oxy-anions of nitrogen at a predetermined pH between about 3 and about 9 to control a concentration of the oxy-anions of nitrogen; and discharging the treated gas comprising a reduced concentration of the nitrogenous compounds.

34. The method of claim 33, comprising controlling a temperature of the absorption chamber to be below about 80° C.

35. The method of claim 33, wherein the oxy-anions of nitrogen comprise at least one of nitrite and nitrate.

36. The method of claim 33, further comprising producing the nitrogenous liquid by contacting the gas stream with water to oxidize at least a fraction of the nitrogenous compounds into the salt of ammonia.

37. The method of claim 33, wherein maintaining the predetermined pH comprises introducing a base into the nitrogenous liquid.

38. The method of claim 33, further comprising maintaining a total dissolved solids concentration in the nitrogenous liquid between about 1 g/L and about 500 g/L.

39. The method of claim 33, further comprising dosing the nitrogenous liquid comprising the salt of ammonia with a biological catalyst in a bioreactor fluidly connected to the absorption chamber.

40. The method of claim 33, wherein the predetermined pH is between about 6 and about 8.5.

41. The method of claim 33, wherein the treated gas comprises less than 1% nitrogen, sulfur, phosphate, and potassium.

* * * * *